United States Patent [19]

Möllgaard et al.

[11] 4,110,826

[45] Aug. 29, 1978

[54] APPARATUS AND PROCESS FOR COLOR-IDENTIFICATION

[75] Inventors: Klaus Möllgaard; Hans Keller; Ulrich Sendtko, all of Kiel; Rüdiger Sommer, Raisdorf, all of Germany

[73] Assignee: Dr. -Ing. Rudolf Hell GmbH., Kiel, Germany

[21] Appl. No.: 728,956

[22] Filed: Oct. 1, 1976

[30] Foreign Application Priority Data

Oct. 7, 1975 [DE] Fed. Rep. of Germany ....... 2544703

[51] Int. Cl.$^2$ ........................... G01J 3/50; G06G 7/75
[52] U.S. Cl. ..................................... 364/526; 356/179; 358/1
[58] Field of Search ....................... 364/526; 358/1, 30, 358/31, 79, 80; 356/173, 177, 179; 256/221, 226

[56] References Cited

U.S. PATENT DOCUMENTS

| 3,558,806 | 1/1971 | Monahan | 358/30 |
| 3,629,490 | 12/1971 | Keller | 358/80 |
| 3,739,078 | 6/1973 | Pugsley et al. | 358/80 |
| 3,758,707 | 9/1973 | Keller et al. | 358/80 |
| 3,783,275 | 1/1974 | Oelmayer et al. | 250/226 |
| 3,804,531 | 4/1974 | Kosaka et al. | 250/226 |
| 3,858,044 | 12/1974 | Frappe | 250/226 |
| 3,885,244 | 5/1975 | Keller | 358/80 |

*Primary Examiner*—Felix D. Gruber
*Attorney, Agent, or Firm*—Ernest F. Marmorek

[57] ABSTRACT

A process for the identification of a predetermined plurality of colors on the surface of an object which is scanned by electrical-optical means to produce measured signals substantially representing the colors red, green, and blue coordinates, the plurality of colors defining color-regions, and defining color-identification-regions, wherein the boundaries of the identification-regions are simulated electronically through threshold-value circuits for each of the coordinates, the output signals of which are transferred to coincidence circuits, which indicate the presence of one of the plurality of colors when the coordinates of the color signals lie within the color-identification-region.

21 Claims, 36 Drawing Figures

APPARATUS AND PROCESS FOR COLOR-IDENTIFICATION

BACKGROUND OF THE INVENTION

The present invention relates to a process for the identification of colors, in which a colored surface is scanned by electro-optical means to measure the presence of selected colors such as red, green, and blue and various other colors are defined by the use of predetermined ranges for the selected colors.

In U.S. Pat. No. 3,210,552, a device has been disclosed for identifying the presence of a color in a test sample by measuring the intensity of selected colors and performing measurements to determine if these intensities were within predetermined ranges. Three optical-electrical transducers were used according to the patent, each responding to a selected light-component of the sample. The output-signal of each transducer represented one of the selected colors and was coupled to a respective control circuit, which generated an output-signal only when the input-signal was within a predetermined and adjustable range. The output signals of the control circuits were transferred to a coincidence-circuit, the coincidence circuit furnished an output-signal only when all of the control circuits simultaneously furnish output-signals. The output-signal of the coincidence circuit indicated the presence of a certain color, that is, a color which is determined by the threshold values of the control circuit.

Thus, from the entire color-region, defined in three dimensional space by the selected colors, a relatively narrow color region with an adjustable volume and adjustable dimensions is defined. If the color of the sample lies within this region, it is identified.

A variant of this spatial color-identification is also described in the aforesaid patent. Instead of operating on a 3-dimensional basis, one can operate on a 2-dimensional basis. In this case, only two optical-electrical transducers are used. This entails the assumption that one of the selected colors is constant. Thus, the 3-dimensional signal processing becomes a 2-dimensional signal processing. The output signals of the transducers are connected to control circuits having adjustable threshold-values which are connected to a coincidence-circuit. An output signal occurs, that is to say the color is identified, when both control circuits furnish an output signal.

Thus, in this 2-dimensional case, one does not define and analyze a solid spatial element, but one eliminates a surface element, that is, the entire color-region is projected onto a plane in which the identification-surface is delineated.

It is furthermore stated in the aforesaid patent that for the identification of several colors, several such circuits with differently adjusted threshold values can be operated in parallel.

The technique of the delineation of specific partial surfaces in a color region reduced to two dimensions has been further developed in the U.S. Pat. No. 3,012,666. This patent describes an improved sorting-out of articles on the basis of their color; this being achieved with the aid of electronic color-identification. In this patent, a light-ray is reflected by the object under test and is split by means of a half silvered mirror into two partial rays, of which one is transferred via a red-filter and the other via a green-filter to separate optical-electrical transducers. In the simplest case, the colors are identified through illumination with monochromatic light, a procedure which is of no interest here. During the scanning with white light, the primary color-measuring-value-signals, which are furnished by the transducers, are evaluated by means of complicated thresholds, whereby the individual color-regions are delineated by means of several straight lines which, electronically, are reproduced through these adjustable thresholds.

This delineation leads to a more refined form of identification of the desired colors and is improved even more by closed areas being outlined by individual straight lines.

Subsequently, this concept also appears in the DT-OS 2,158,758 and DT-OS 2,404,201 (supplement to DT-OS 2,158,758. In the DT-OS 2,404,201, a coordinate-transformation of the original color-measuring-value-signal is carried out in addition; however, a projection of this converted coordinate-system is made on one of the principle planes and thereafter, the evaluation-system which is obtained in this manner and which possesses one less dimension than the transformed coordinate-system, is evaluated according to the known demarcation as figures lying in a single plane. In the case in which one works with three primary colors, this leads to a reduction of the identification-problem from the 3-dimensional color-region to 2-dimensions. This corresponds to the color-identification process according to the U.S. Pat. No. 3,210,552 and No. 3,012,666.

The types of color-identification processes described up to now which, in essence, are based on the reduction of the evaluation to 2-dimensions, have decisive disadvantages, as many cases of their application have shown. For example, in techniques used in the textile industry, colored sample copies such as textile-pattern designs which have been hand-painted by an artist are electro-optically scanned, in order to identify the color of the individual pattern copies in individual color fields or in color samples, and record this color as information on a data-carrier for the control of the weaving looms. In this process, in which many inadequate conditions arise, the above described identification method has furnished results which were not satisfactory. Tolerances of commercially available dyes or pigments, inaccurate manual application of colors, soiling of the white pattern-carrier through small spatterings of black color during the printing of the screen of the pattern-carrier of the untreated pattern-carrier, and painting over corrected places, all of which lead to wrong color-identification, and also fluctuations of the color quantity, are to be included among such typical shortcomings.

The present invention is therefore based on the task of indicating an improved process for the identification of one color of a colored sample, from among a large number of colors which are present, which — in the case of an electro-optical scanning sample — has a considerably greater freedom from errors.

SUMMARY OF THE INVENTION

The present invention endeavors to overcome the problems in the prior art. The selected colors, say red, green, and blue form a color-region and define a "grey straight-line" and are transformed into a chrominance — luminance — color-region $(x,y,z; x',y',z'; x'',y'',z'',$ etc.), in which the color-components of the measured sample are assigned to the chrominance-coordinates $(x,y; x',y'; x'',y'',$ etc.) and the brightness of the measured sample is assigned to the luminance-coordinate $(z)$, whereby the luminance-axis coincides with the grey-axis of the first color-region, in that the chrominance-signals (x,y; uvw) are transformed through a second transformation into a second chrominance — luminance — color-region so that the chrominance-signals are extended as a function of the luminance (z) below and above a prescribed luminance value or region z, and the color-identification-regions are delineated by corresponding, constant thresholds or double-thresholds for the individual coordinates in this color-region (x'y'z').

A decisive advantage of the solution according to the invention is that a considerably better separation is possible in the case of the individual color-regions color-chambers than in the case of the known process.

The combination of the following criteria make possible an accurate separation of the curved color-regions. The first transformation (known by itself) of the RGB-(red-green-blue) color-region into a chrominance-luminance — color-region, the second transformation of this color-region, through rotation around the luminance-axis, into a second chrominance luminance — color-region, and not rotated chrominance — coordinate-values as a function of the luminance below and above of a prescribed luminance-value or region, and the superposition of the rotated analogous chrominance-signals extended as a function of the luminance-coordinates, with the spatial evaluation (known by itself) through double thresholds. For each coordinate, a double-threshold is possible, which — in each case, represent two opposite lying sides of the color-identification-region. Not all double thresholds have to be used. That is, when one is dealing with a simple pattern, a delineation with little external surface can be obtained. In the cases of color-regions, curved to different extents, an accurate separation is possible, because the extent of the rotation of the chrominance-signal-values can be adapted to the curvature of the color-regions as a function of the luminance. This equivalent solution, the combination of the RGB-color-region into a chrominance-luminance — color-region and the spatial evaluation of the color-identification-regions with double thresholds likewise brings an accurate separation of the curved color-regions, whereby the characteristic feature lies in changing the threshold-value-voltages of the thresholds not in a constant manner, but as a function of the luminance-coordinate.

Should the color regions, in which a color occurs, be complicated spatial or 3-dimensional formations, it has been proven to be especially advantageous in both cases to subdivide these formations into several color-identification-regions which lie adjacent to one another in the direction of the luminance-axis.

A further advantageous embodiment of the invention lies in rotating the chrominance-luminance — color-region around its luminance-axis and in carrying out the spatial evaluation simultaneously in the reference and rotated chrominance-luminance-systems after extending the chrominance-corrdinates as a function of the luminance or by using threshold-value-voltages which are a function of the luminance. Both systems are superimposed over the other. In the case of a single rotation, identification-regions with six double thresholds can be used; if a third rotation is carried out, a total of eight double thresholds are available.

A particularly advantageous embodiment of the invention lies in the transformation (known in itself) of the RGB-color-region into a chrominance-luminance — color-region with one luminance-coordinate and two chrominance-coordinates, a transformation with three chrominance-coordinates is carried out. Here, right from the beginning, eight double thresholds are available for the delineation of the color-identification-regions, and when using one rotation around the luminance-axis, 11 double thresholds are available.

Further objects and advantages of the invention will be set forth in part in the following specification and in part will be obvious therefrom without being referred to, the same being realized and attained as pointed out in the claims hereof.

BRIEF DESCRIPTION OF THE DRAWINGS

In the accompanying drawings.

DESCRIPTION OF THE PREFERRED EMBODIMENT.

Figure 1:
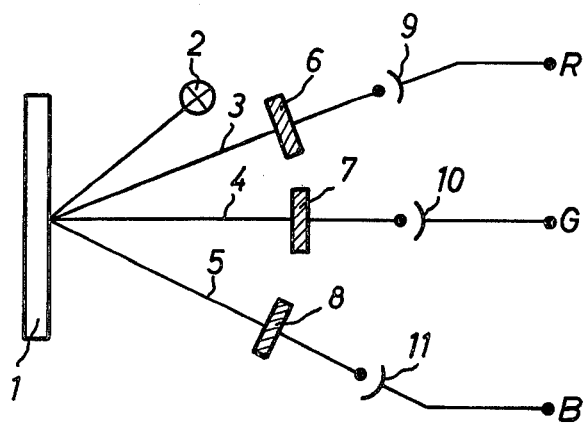
FIG. 1 is a schematized illustration of a scanning unit.

FIG. 1 schematically shows a system for obtaining the color — measuring-value — signals R,G,B. An image-pattern 1 is illuminated by means of a white light-source 2. Through the intervention of semi-permeable or half-silvered mirrors which are not illustrated, 3 partial light-rays 3, 4, and 5, are obtained which, via filters 6, 7, and 8, are transferred to the optic-electrical transducers 9, 10, and 11. The filters 6, 7, and 8 are known dichroic filters, namely the red-filter 6, the green-filter 7 and the blue-filter 8. At the outputs of the transducers 9, 10, and 11, the primary color — measuring-value — signals then show up as the red-filter signal R, the green-filter signal G and the blue-filter signal B. These signals can be represented in a R,G,B-color region.

Figure 2:
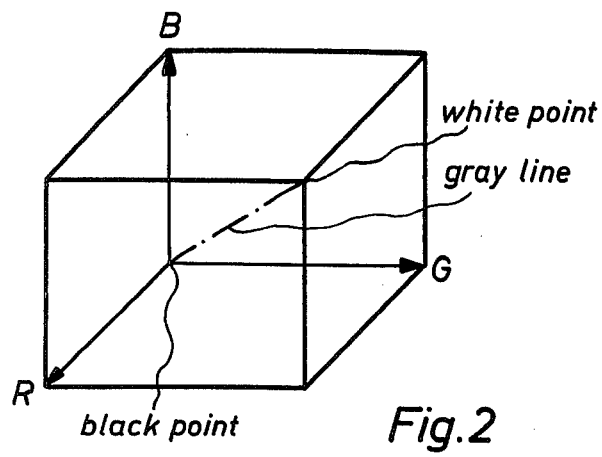
FIG. 2 is a color-region (R,G,B) established by the primary color — measuring-value — signals.

In FIG. 2, the color-region established by the primary color — measuring-value signals is illustrated in an idealized form. The axes R,G,B indicate the red-, green-, and blue-filter-signal. The origin of the coordinates, at which point all signals have the value of zero, represents the black color or black-level and the corner point of the color-chamber at which all filter signals have their maximum value, represent the white color or white-level. The connecting line between the black-point and the white-point is called the "gray straight-line."

Figure 3:
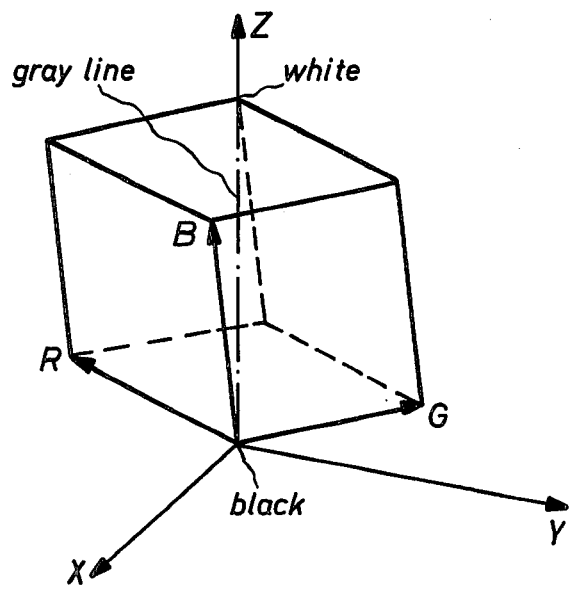
FIG. 3 shows the first transformation of the R,G,B-color-region.

FIG. 3 shows a first coordinate-transformation of the R,G,B-color-region into a so-called chrominance — luminance — color-region with the axes $x$, $y$, and $z$, whereby the $x$-, and $y$-axes represent the chrominance signals (color-signals) and the $z$-axis represents the luminance-signal (brightness). Transformations of this type are well known procedures in the television technology. In this respect, reference is had to "H. Schönfelder, Fernsehtechnik I, I. Liebig Verlag, Darmstadt, pages 3/13, 3/14, and 3/14B." The R,G,B-signals are transformed in this reference into an $x,y,z$-coordinate-system, but in that case, the $y$-axis corresponds to the luminance, that is to say to brightness.

In the case of the instant invention, a special transformation is carried out, the gray straight-line of the R,G,B-color-region becomes the $z$-axis which represents the luminance-signal (brightness), and $x$-, and $y$-axes extend symmetrically with respect to the B-, and G-axes. This is achieved through a simple tilting of the R,G,B-color-region up to the point at which the gray straight-line coincides with the $z$-axis. Subsequently, the $x$- and $y$- axes are rotated around the $z$-axis, whereby the symmetry conditions for the $x$-, and $y$-axes are fulfilled. FIG. 3 shows the results of this tilting.

Figure 4:
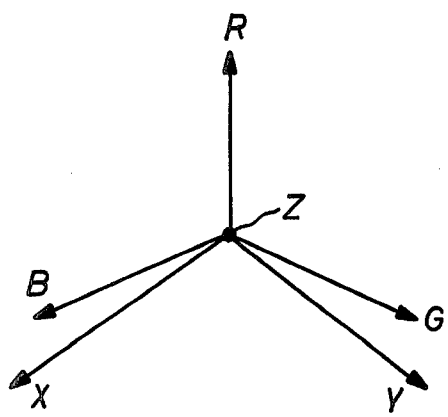
FIG. 4 shows a top-view of the coordinates of the transformation according to FIG. 3.

In FIG. 4, only the axes of the R,G,B-color-region and of the new $x,y,z$-color-region are shown, in order to illustrate the rotation around the $z$-axis. The symmetry becomes easily recognizable, from a top-view in the direction of the $z$-axis. The angle of rotation amounts to 15° and the transformation equations read as follows:

$x = 0.789 R - 0.211 G - 0.578 B$
$y = 0.214 R + 0.789 G - 0.578 B$
$z = 0.578 R + 0.579 G + 0.578 B.$

Figure 5:
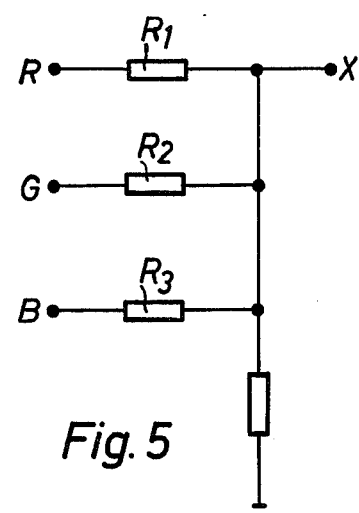
FIG. 5 shows an example of a transformation-matrix.

FIG. 5 shows a circuit arrangement for the implementation of such a transformation. It can be a simple resistance-matrix. The primary color signals R,G,B, are fed to resistors $R_{17}$, $R_{21}$, and $R_{31}$, respectively, a junction of the aforesaid resistors being connected to a resistor $R_4$ whose other terminal is grounded. The resistors $R_1$, $R_2$, and $R_3$ are selected in accordance with the constants of R,G,B of the transformation equations. For each variable $x,y,z$, such a matrix is provided. For the generation of negative signal-components, sign-inverters, (which are not illustrated here) have to be introduced in each case, ahead of the corresponding resistors $R_1$, $R_2$ and $R_3$.

Figure 6A:
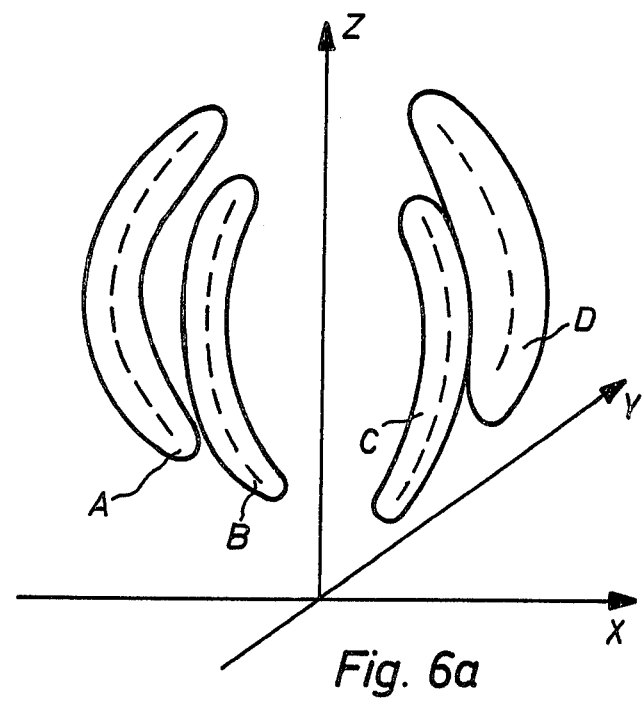
FIG. 6a shows the location of a few colors within the x,y,z-color-region.
Figure 6B:
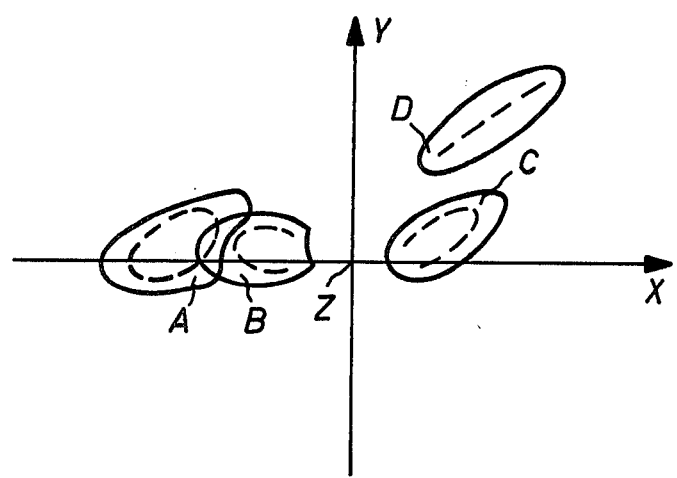
FIG. 6b shows the positions colors can have in the case of a conventional color-separation process.

In FIGS. 6a and 6b, the signals — which actually occur during the scanning of colors utilized in practice — are recorded in the $x,y,z$-chrominance — luminance — color-region.

FIG. 6a shows the spatial regions A, B, C and D, within which the signals of four different colors lie. The banana-shaped form is characteristic.

FIG. 6b shows a top-view of the color-region and it is evident that the colors A and B surround one another spatially, which leads to an overlapping in the projection.

As can be readily understood, here lies a difficulty of the separation of these two colors A and B. In the case of the known identification-processes, which work with the two-dimensional evaluation of the regions A to D through threshold-values (straight-lines), this separation is not possible. As can be seen from FIG. 6a, the color-position of a color depends very much on the $z$-axis, that is to say on the brightness, but the known color-identification process does not consider the third coordinate. The third coordinate, the $z$-axis, is specifically taken into account by the instant invention. In order to clarify these inter-relationships, the delineation of the color-region around the color of FIG. 6a, is drawn-in in FIG. 7. The colors themselves are drawn-in as "idealized lines". The "black" level lies at the origin of the coordinates, the "white" level on the $z$-axis. The apex of the color-region surrounding the colors has a form of a double-cone.

So that the colors can be separated, and so that overlappings of the type shown in FIG. 6b (fields A and B) do not occur, a further, very specific transformation of the color-region is carried out.

Figure 8:
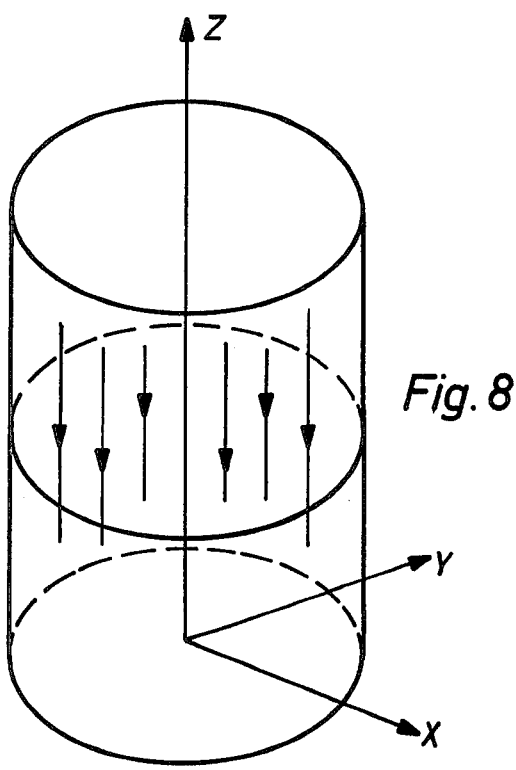
FIG. 8 shows the location of the colors after a further transformation within a cylindrical space.

In FIG. 8, the color-region formed in the shape of a double-cone, is transformed into a cylinder. One can see that the originally curved lines defining the colors are stretched or extended, as a result of which overlappings in the $x,y$-plane no longer occur.

Figure 9A:
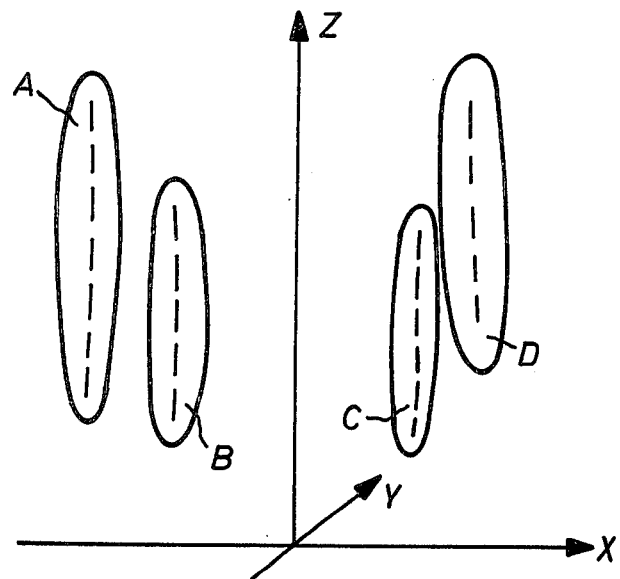
FIG. 9a shows the location of a few colors after the transformation.
Figure 9B:
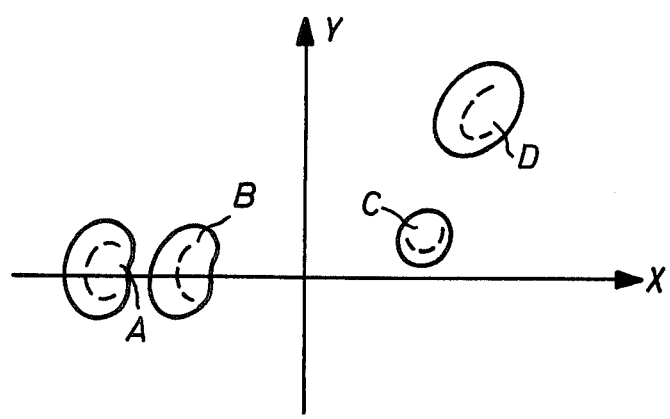
FIG. 9b shows a comparative illustration to FIG. 6, after the transformation.

This is once more illustrated in a more accurate manner in FIGS. 9a and 9b.

The color-regions A, B, of FIGS. 6a and 6b, which overlap one another have been extended at their end portions and, as FIGS. 9a and 9b show it, the overlapping no longer occurs. The regions A, B, C, and D, are no longer curved at their extremities. Thus, the absence of any overlapping makes possible a clean separation of the regions.

Figure 10:
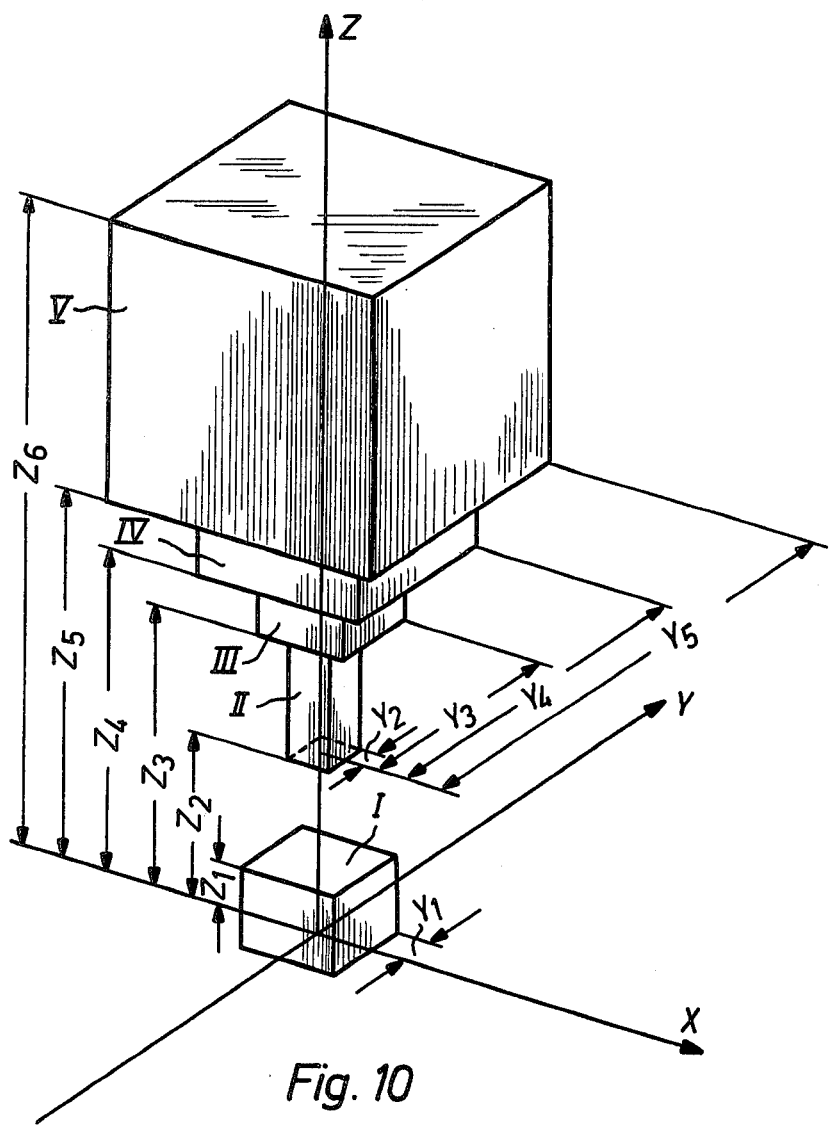
FIG. 10 shows a subdivision of the color-region into color-identification regions.

For the purpose of the actual color-identification, one first of all examines the z-axis FIG. 10 shows the manner in which the z-axis, that is to say the brightness-axis, is subdivided into regions which are delineated by different z-values, as well as x-, and y-values. The values $z_1$ to $z_5$, $y_1$ to $y_5$ and $x_1$ to $x_5$ define these regions. For the sake of a clear arrangement, values $x_1$ to $x_5$ were not recorded here. The corresponding x-values are recorded in FIG. 11, which shows a section in the z-x -plane of FIG. 10. The identification-regions I to V of FIGS. 10 and 11 can be delineated in each case through the threshold-values for $z$, $+x$, $-x$, $+y$, $-y$. Thus, to give an example, region I can be delineated through $$0 \leq z \leq z_1$$

$$-x_1 \leq x \leq x_1$$

$$-y_1 \leq y \leq y_1,$$

and region II through $$z_2 \leq z \leq z_3$$

$$-x_2 \leq x \leq x_2$$

$$-y_2 \leq y \leq y_2.$$

If the components of the transformed R,G,B-signals in the first chrominance-luminance — color-region lie within the regions I to V, the colors assigned to these regins are identified. Thus, to give an example, region I is representative for "black" and regions II to V for "white."

The absence of any curvature of the color-fields results also in an accurate delineation of the regions, with respect to the color-identification-regions, I to V of FIG. 10, as a result of which a very accurate identification of "white" is made possible. Without this extension or stretching of regions A to D in FIG. 9a, the end-portions of regions A to D would fall within the regions I to V, and these regions could then not be defined unambiguously.

A further development of the solution based on the present invention can be made by reducing all z-values, which are of a larger order of magnitude than $z_6$ (region V), to $z_6$, these values thus remaining in the identification-region V.

According to the evaluation of the z-axis in different regions with different dependence on z, x, and y, a considerably improved identification of "white" and "black" was obtained. However, in order to be able to clearly identify also the remaining regions which do not fall into the z-regions I to V, a further coordinate-transformation is carried out.

Figure 12:
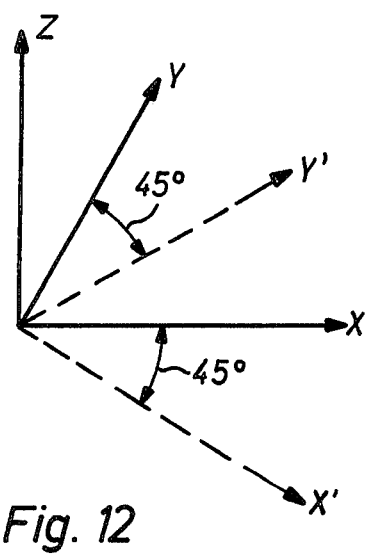
FIG. 12 shows the coordinates, in accordance with which a further transformation in form of a rotation is carried out.

FIG. 12 shows such a transformation, in the case of which the chrominance-luminance — color-region x,y,z is rotated around the z-axis. One obtains the x′,y′,z′-coordinate system illustrated in FIG. 12 which, in the given example, is rotated by 45° with respect to the x,y,z-system. Other angles of rotation are likewise advantageous.

Furthermore, still one or several additional rotations of this type can follow, depending on how stringent the requirements are set for the identification-device. The purpose of this type of additional transformation becomes apparent from FIG. 13. After one had first of all analyzed the z-coordinate (FIGS. 10 and 11) and z-values have been furnished, which, with their corresponding x-, and y-components, do not fall into the regions I to V, these signal-triplets are analyzed in the x,y,z-system which had been superimposed by the newly rotated x′,y′,z′-system. It should be pointed out in particular, that the z-coordinate has not been suppressed, but had been evaluated.

Figure 13:
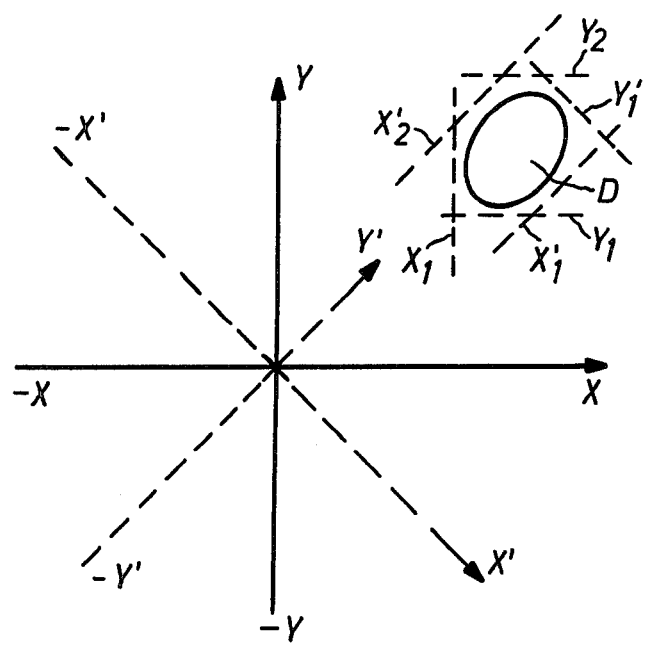
FIG. 13 shows the delineation of a color through threshold-values.

FIG. 13 shows a color-region D, which lies in the x,y,z-, and y′,x′,z′-coordinate-system. We are dealing here with the color-region D of FIGS. 9a and 9b. Around the color-region D, delineated thresholds are placed, namely $x_1$, $x_2$, $y_1$, $y_2$, $z_1$, $z_2$, $x'_1$, $x'_2$, $y'_1$, $z'_1$, $z'_2$. The thresholds belong to the x,y,z-system, as well as to the rotated x′,y′,z′-system. It should be pointed out that in the example given in FIG. 13, only 8 thresholds were used, because the x′-values were only used as $x_1$ and the y′-values were used only once as $y_1'$. One can also use geometrical figures for the delineation in which all values or also fewer thresholds occur, depending on what is the most expedient. It can be seen from the FIG. 13, that it is possible to delineate a transformed color-value with respect to its chrominance in a simple manner by means of up to ten straight lines, that is to say threshold-values, after having already analyzed the z-component in each of the color-regions I to V ten times at seven threshold-values (each region I to V is delineated by six threshold values). Thus, spatially complicated formations can be analyzed with a great degree of accuracy and classified. The regions A, B, and C of FIGS. 9a and 9b can be likewise delineated by such straight lines, which — electronically — are simulated as thresholds or as double-thresholds.

Figure 11:
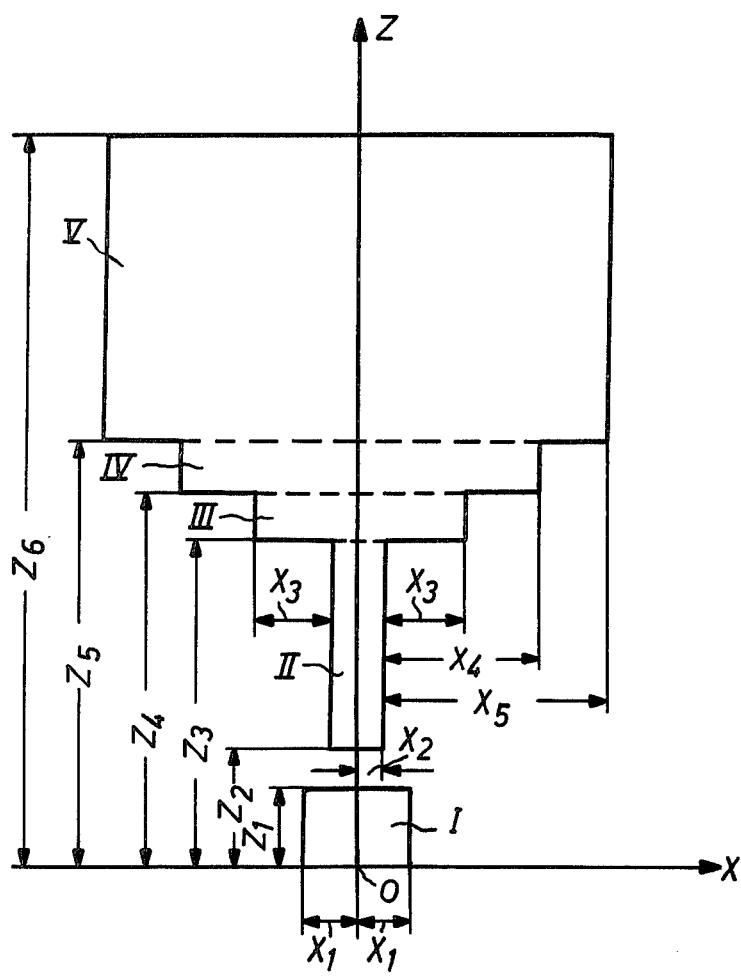
FIG. 11 shows a cross-section through FIG. 10, for the purpose of illustrating the thresholds for x and z.
Figure 14:
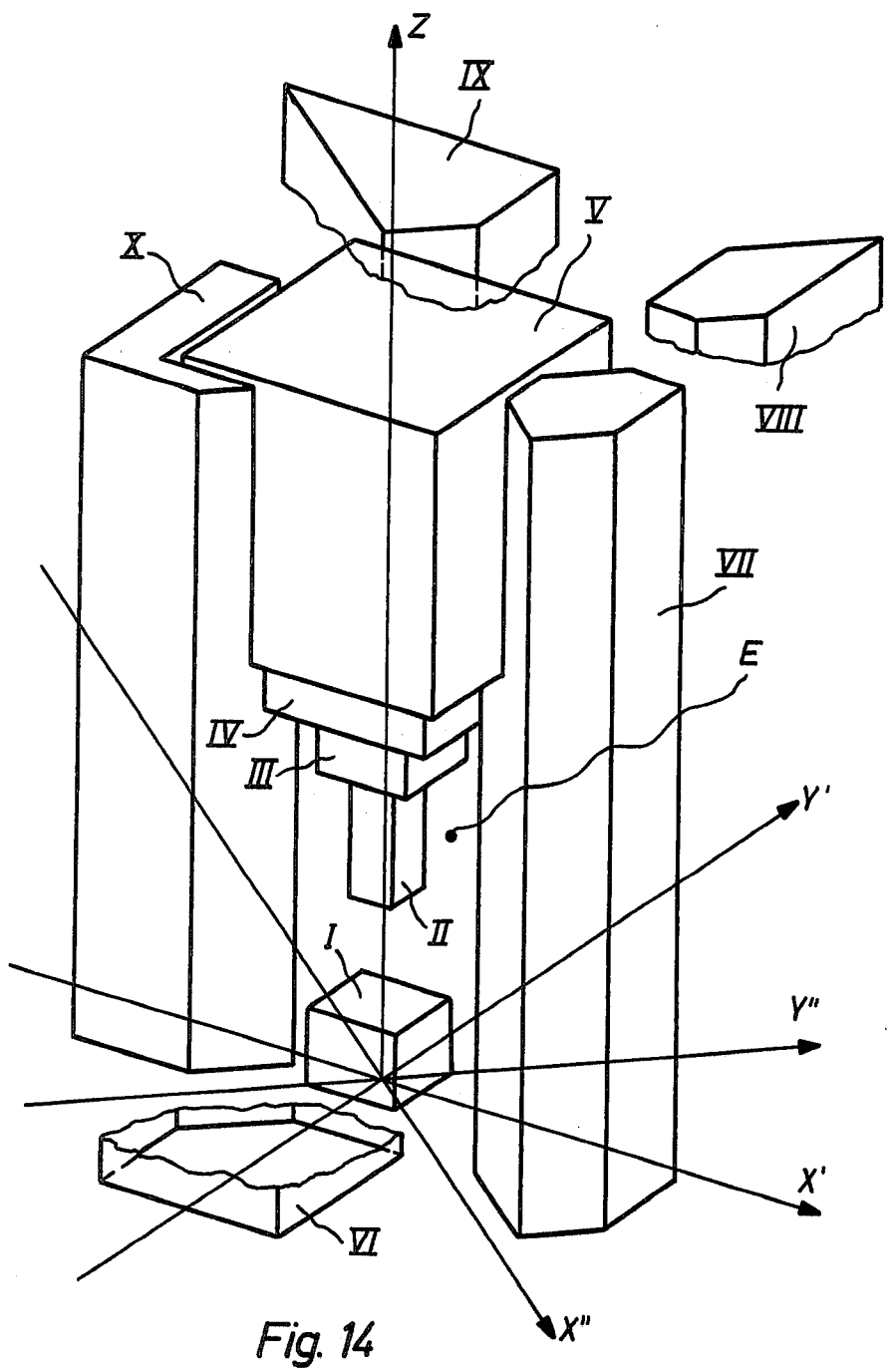
FIG. 14 shows a spatial representation of the color-identification-regions.

FIG. 14 shows a 3-dimensional representation in the x,y,z-coordinate system and in the superimposed x′,y′,z′-system. A large number of color-identification-regions constructed by means of thresholds — are represented, with the aid of which the transformed distorted and delineated measuring-values can be evaluated. Thus, the regions I to V of FIGS. 10 and 11 are present, as well as a few regions VI, VII, VIII, IX, and X, which actually represent only a small fraction of the color-identification-regions actually utilized, the representation of which was foregone for the sake of retaining clarity of the illustration. In actual practice, one such prismatic identification-region is provided for each color to be identified.

In FIG. 14, furthermore, a color-point "E" is shown which, to give an example, is detected by the optical system in the case of an impure color. As can be seen, this color-point is not recognized as a color; however, it will nevertheless be evaluated, as will be described in more detail in connection with FIG. 21.

Figure 15:
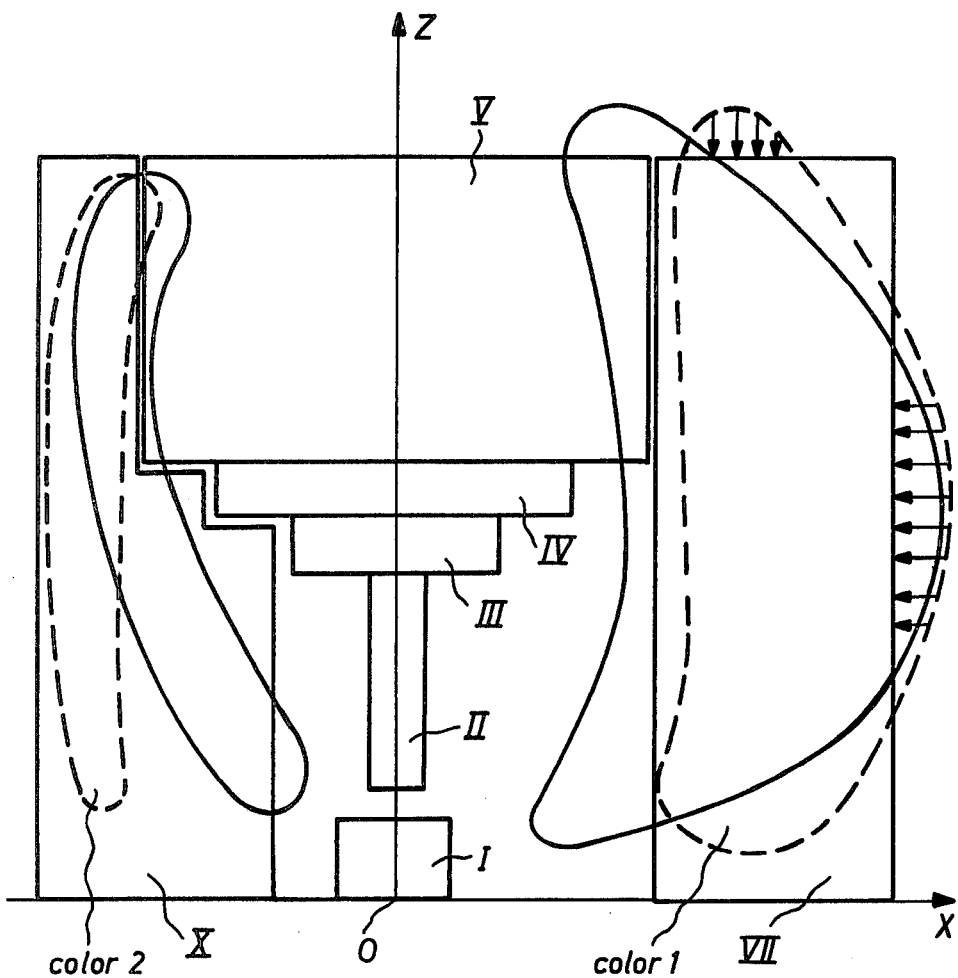
FIG. 15 shows an example of the transformation of a color and of its delineation within a color-identification-region.

FIG. 15 shows a cross-section through FIG. 14, namely through the x′-, and z-axes. In the color identification-region V, it can be recognized that the color 1 — after extension in the x-direction as a function of z — extends for its major portion within the color-identification region VII. Due to the fact that in the course of this extension, a delineation of the color-region had been carried out, the x-values — which, on the right hand side, lie outside of the color-identification-region — are reduced to the threshold-values and recognized as color 1. Also, the lower partial region of color 1 is transformed into the color-identification-region VII. In the upper partial-region V for z, a portion of the color 1 remains in the identification-region V. The color 1 becomes more and more color-desaturated with an increasing Z and the values which lie in the identification-region V are recognized as "white," which is what is required in actual practice. Such a practical case would arise, for example, when a color would be painted over with white for the purpose of making a correction. The filter signals furnish a small color-portion; however, it is intended that this place is recognized as "white," which is also achieved through the spatial extension of the identification-region V in x-, and y-direction. The same applies to color 2 in the identification-region X.

Figure 16:
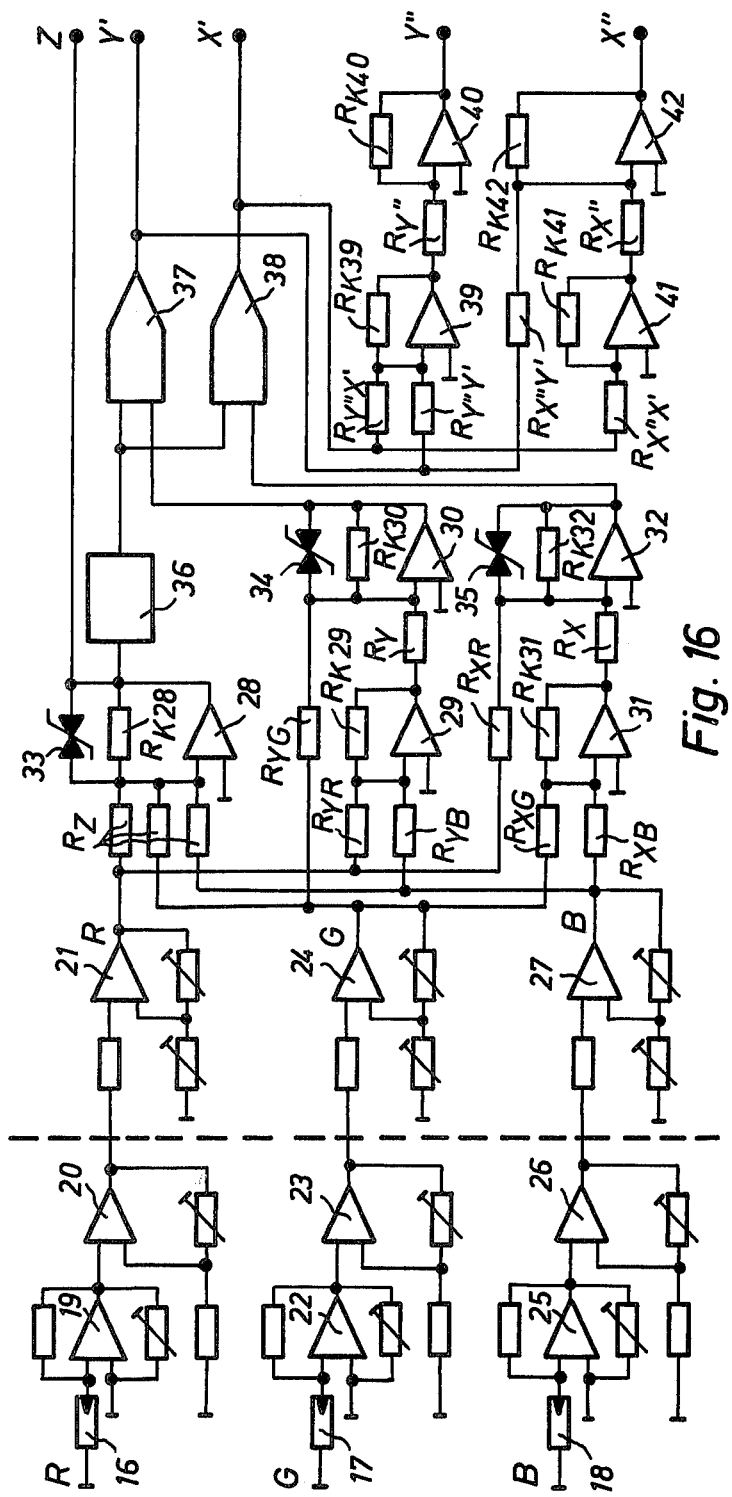
FIG. 16 shows a circuit arrangement for the execution of the color-transformations.

FIG. 16 is a circuit diagram for the coordinate-transformations with the linear deformation and the delineation of the chrominance-signals. For purposes of simplification, the scanning arrangement given in FIG. 1 is merely illustrated here by the photo-elements, 16, 17, and 18 which furnish the red-, green-, and blue-filter-signals R, G, B. These signals are amplified by the processing amplifiers 19 to 27 which are inserted in the circuit after the photo-elements 16, 17, and 18. The operational amplifiers 28 to 32 carry out the linear coordinate-transformation according to the given transformation-equations. At the outputs of the amplifiers 28, 30, and 32, the $x,y,z$-values of the first chrominance-luminance — color-region appear. In the case of this transformation, each primary color — measuring-value — signal is transferred to the two other channels, in accordance with the constants of the transformation-equations which are taken into consideration through the determination of the resistors of the operational amplifiers. This circuit, designed for the execution of the transformation by means of operational amplifiers, operates in principle in the same manner as the resistance-matrix illustrated in FIG. 5. The difference is that, in order to avoid losses, active elements — in the form of the operational amplifiers which are wired with corresponding resistors — were used. As it is known, the amplification-power of the operational amplifiers can be very accurately adjusted by the choice of the resistors and the parameters of the transformation-equations can be reproduced. To give an example, this point will be discussed here for the x-coordinate and for the z-coordinate. The circuit for the y-coordinate transformation corresponds in essence to that for the x-coordinate, as it can be seen from FIG. 16.

The equation for x reads as follows:

$$x = 0.789 R - 0.211 G - 0.578 B$$

$$x = 0.789 R - (0.211 G + 0.578 B).$$

The parentheses represent an addition of G and B and is carried out at the summation-input of the operational amplifier.

The green-channel G is coupled through resistance $R_{xG}$, and the blue-channel B is coupled through $R_{xB}$, and the corresponding values are added one to the other in the proportions given by the constants within the parentheses. At the output of the operational amplifier 31, a negative signal occurs and the summation-input of the operational amplifier 32 is added to the R-component supplied via a resistance $R_{xR}$. By the choice of the resistances $R_{xR}$, $R_{xB}$ and $R_{xG}$ and of the feedback-resistances of the operational amplifiers 31 and 32, the transformation-equation is therefore implemented.

An additional transformation is carried out. As slightly saturated colors lie close to the zero point, an additional extension of the x, y-coordinates is carried out and these colors move further away from the zero point. In this manner, their differentiation from "black" is made considerably easier.

This extension is carried out in the following manner. One introduces a constant factor k into the transformation equation, resulting in:

$$x = k [0.789 R - (0.211 G + 0.578 B)].$$

This is achieved in that the signal at the operational amplifier 32 is correspondingly amplified, by adjusting the feedback resistance $R_{k32}$ in corresponding proportion to the resistances of $R_{xG}$ and $R_{xB}$.

The transformation of the z-component is carried out at the processing amplifier 28. In accordance with the transformation-equation $$z = 0.578 R + 0.578 G + 0.578 B,$$

3 equal resistances $R_z$ are coupled to the summation-input of the operational amplifier 28, with these resistances furnishing the R,G,B-components.

A further characteristic feature of the present invention lies therein, in that the z-axis, as well as the x,y-components are limited in their amplitudes. This has the advantage that the x,y,z-values falling within the hatched region in FIG. 15 are reduced to the maximum value of the corresponding identification-region. In the FIG. 16, this takes place in the following manner, namely in that the feedback-resistances of the operational amplifiers 28, 30, and 32 are each bridged across by pairs of Zener-diodes 33, 34, and 35, each being connected in opposing relationship. Through this, the amplification of the operational amplifiers is limited and therewith also their output voltage.

In order to be able to better distinguish the light colors from "white" and the dark color better from "black", a further additional transformation is carried out, namely the x-, and y-values are extended or amplified in varying degrees as a function of z.

Figure 7:
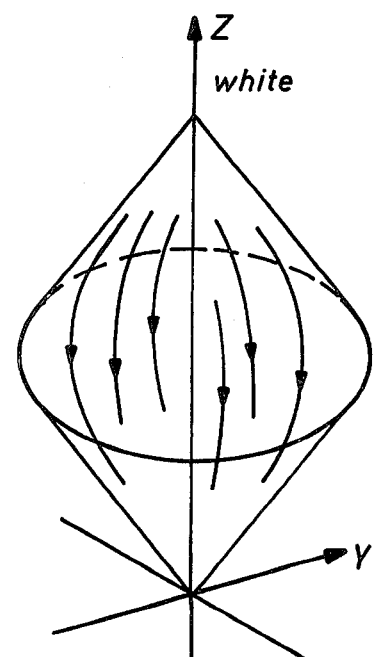
FIG. 7 shows a schematized rendering of the location of different colors in the x,y,z-color region.
Figure 17:
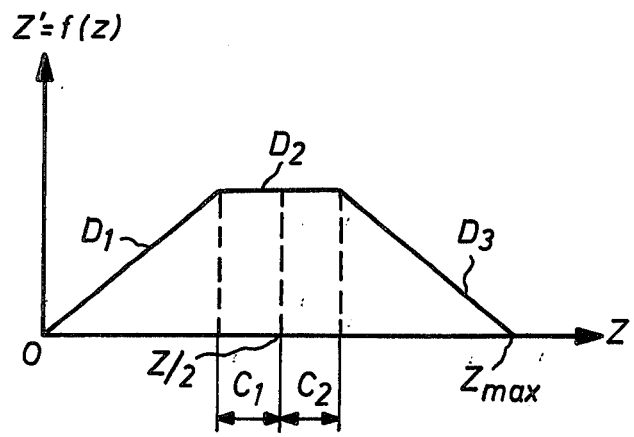
FIG. 17 shows a representation of a function utilized in the case of one of the transformations.

To illustrate the dependence on the z-values, FIG. 17 shows a graphic representation of the mathematical function with which these transformations, which are schematically illustrated in FIGS. 7 and 8, are carried out. This transformation results therein, in that the color-regions which are curved in FIG. 6a, are straightened out in the manner shown in FIG. 9a.

Figure 18:
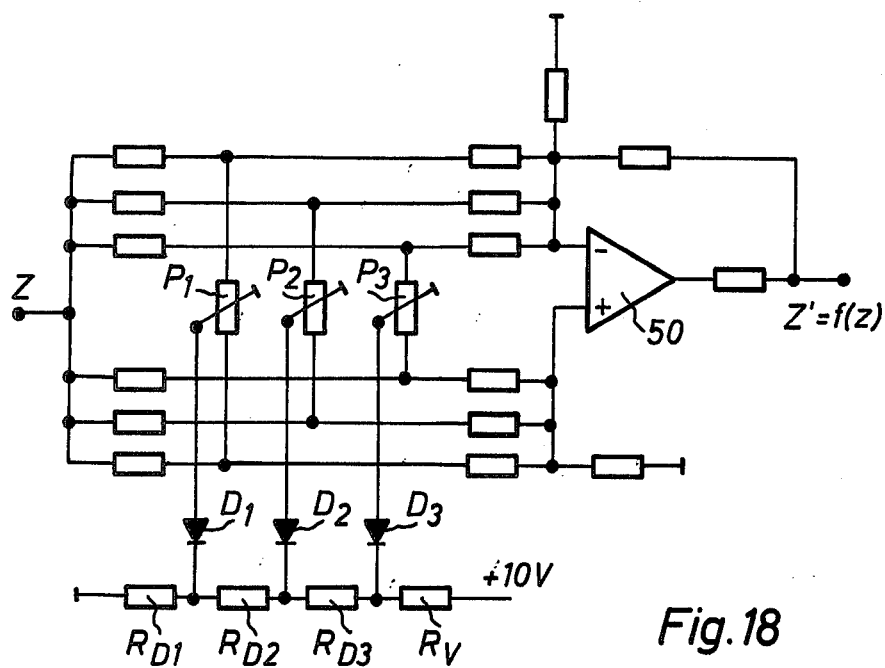
FIG. 18 shows a circuit for the creation of the function according to FIG. 17.

For the implementation of this transformation, dividing-units 37 and 38 are inserted, in the circuit shown in FIG. 16, beyond the amplifiers 30 and 32, with the aid of which the chrominance-signals are divided by a signal-value which is dependent on z. These z-dependent signal-values (FIG. 17) are obtained with the aid of a function-generator 36 which is illustrated in FIG. 18. For small z-values, this function has a small amplitude, which increases up to a value of $(z/2) - c_1$, remains constant over the region $c_1 + c_2$ and again decreases in the region $(z/2) + c_2$ to $z_{max}$. By dividing the x, y-values with this function, the small x-, or y-values are increased, whereby the increase decreases with an increasing z. In the regions $c_1 + c_2$, the function is to be $f(z) = 1$, as a result of which no distortion of the x, y-values occur. If $f(z)$ now increases above $(z/2) + c_2$, again a slow increase of the x, y-values occurs, which attains its maximum value at $f(z) = z_{max}$. The constants $c_1$ and $c_2$ can also be equal to one another.

FIG. 18 shows an appropriate circuit for obtaining the function $f(z)$. An operational amplifier 50, which operates as a difference-amplifier, uses three characteristic line-segments are defined by three diodes; the breakdown or transition points of the diodes $D_1$, $D_2$, $D_3$ are determined by means of the resistances $R_{D1}$, $RD_2$ and $R_{D3}$ which, together with the resistance $R_v$, form a voltage divider. The increase of the diodes is determined by means of the potentiometers $P_1$, $P_2$ and $P_3$. The remaining resistances are constructed in such a manner that the input-signal z arrives in equal portions at the plus-, and minus-input of the amplifier 50. Due to the fact that the diodes $D_1$, $D_2$, $D_3$ are supplied different voltages by the voltage-divider $R_{D1}$, $R_{D2}$, $R_{D3}$ of a relatively low-resistance, the wipers of the potentiometers are reduced to these voltage-values when the voltages at the wiper reach or exceed these values. If the wipers lie in the middle range, the input-voltage z is divided symmetrically over the plus-, and minus-input of the amplifier, and no signal occurs at the output terminals of the amplifier.

If the potentiometers are then adjusted, the input-voltage z is divided in a different manner over the plus-, and minus-input of the operational amplifier, whereby the difference-voltage depends on the point traversed on the characteristic-curve of the diode responding. In FIG. 17, these different parts of the graph are designated with $D_1$, $D_2$, and $D_3$.

For the dividing-unit, a circuit of the usual industrial type can be used, such as, for example, a Motorola type MC 1494.

In the arrangement shown in FIG. 16, the transformation of the chrominance-signals as a function of the luminance, is followed by a further transformation in the form of a rotation around the z-axis. With the aid of the amplifiers 39, 40, 41, and 42, the corresponding transformations are simulated. An advantageous angle of rotation is one of 45°, for which the transformation-equations read as follows:

$$x'' = 0.707 (x' - y')$$

$$y'' = 0.707 (x' + y').$$

The first equation is realized with the aid of the operational amplifiers 41 and 42. At the summation-input of the operational amplifier 41, the $x'$-component appears which, at the output terminals, is inverted to $-x$ and is transferred together with the $y'$-component to the summation-input of the amplifier 42. The corresponding factors of the transformation-equations are taken into account by the forms of construction of the resistances $R_{x''}$, $_{x'}$, $R_{y''y'}$, $R_{y''x'}$, as well as of the feedback-resistances $R_{k39}$, $R_{k40}$, or $R_{k41}$, $R_{k42}$ and of the summation-resistances $R_{y'}$ and $R_{x''}$. We are now dealing with the situation that at the output terminals of the circuit designed according to FIG. 16, the multiply transformed chrominance-signals $x'$, $x''$, $y'$, $y''$ and the luminance-signal z are present, which are now used for the actual color-identification.

Figure 19:
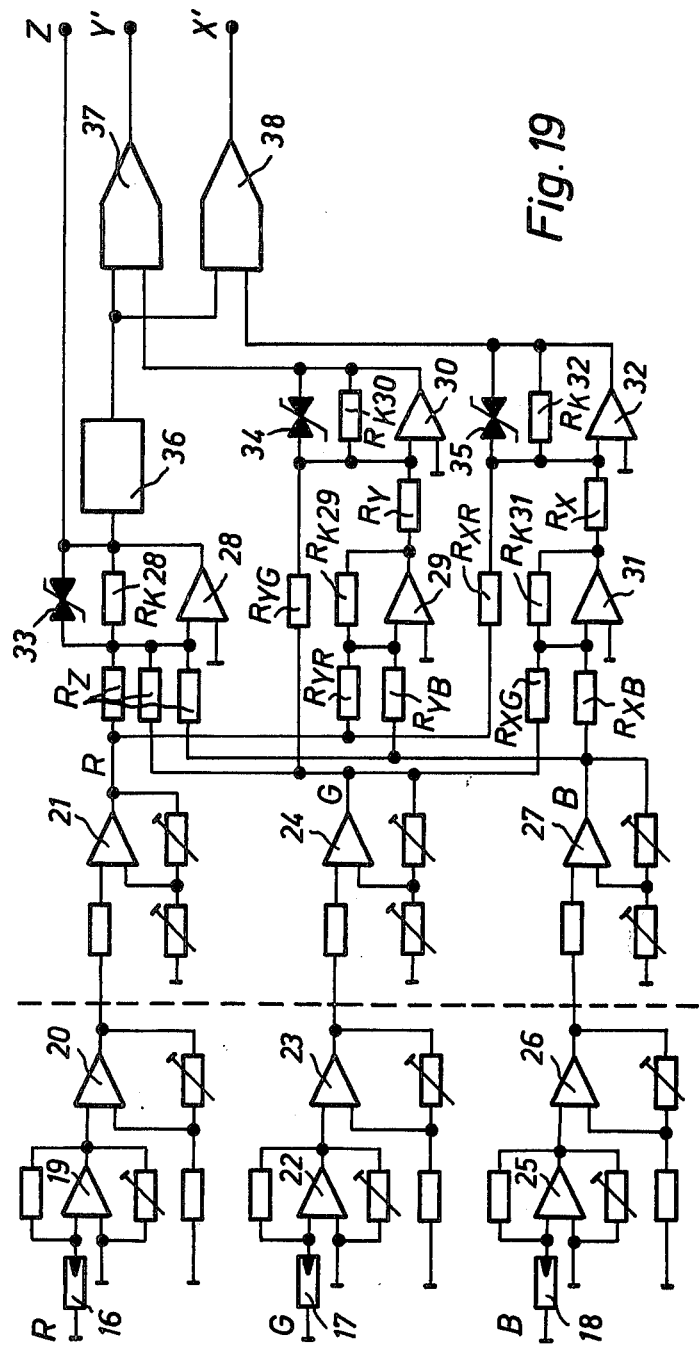
FIG. 19 shows an additional exemplified embodiment for a transformation-circuit.
Figure 20:
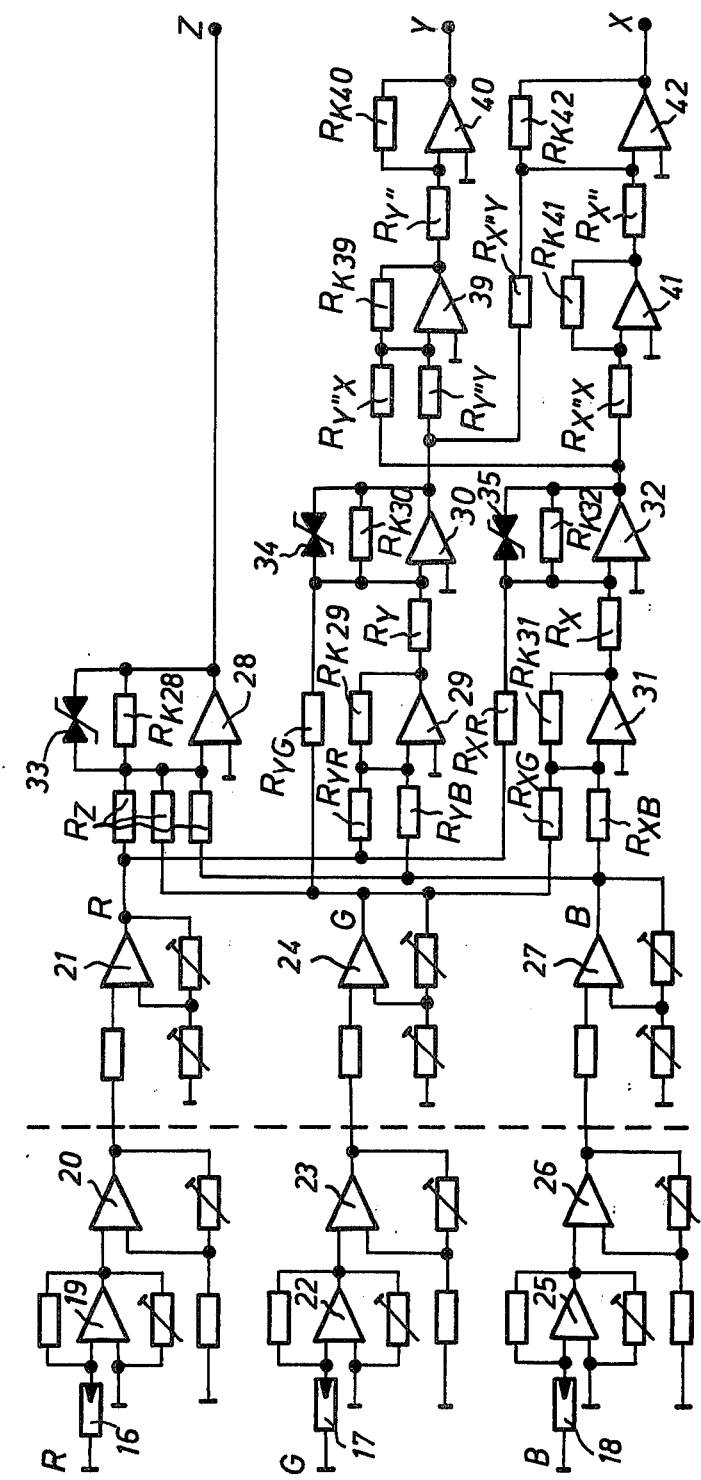
FIG. 20 shows an additional exemplified embodiment for a transformation-circuit.

As a variation of FIG. 16, solutions are also possible, which only operate on the z-dependent distortion of the chrominance-signals or without the former, or solely operates on the rotation around the z-axis, as this will become apparent from the following discussion of FIGS. 19 and 20.

In FIG. 19, the circuit arrangement starting with the photo-cells 16, 17, and 18, up to the output terminals of the amplifiers 28, 30, and 32, is similar to the circuit arrangement shown in FIG. 16. The dividing-units 37 and 38, as well as the function-generator 36, are likewise similar to those shown in FIG. 16. The circuit arrangement shown in FIG. 19 therefore operates without any of the rotated signals $x''$ and $y''$ and is entirely sufficient for many cases.

FIG. 20 likewise shows a modification of the circuit-arrangement designed according to FIG. 16, in the case of which the rotated signals $x''$ and $y''$ do occur in addition to the signals $x'$ and $y'$. The signals $x'$ and $y'$ were not, however, subjected to the transformation with the z-component with the aid of the dividing-units 37 and 38, and the function-generator 36, and the elements 37, 38, and 36, were therefore omitted from this circuit-arrangement. This circuit-arrangement is sufficient for many cases.

Figure 21:
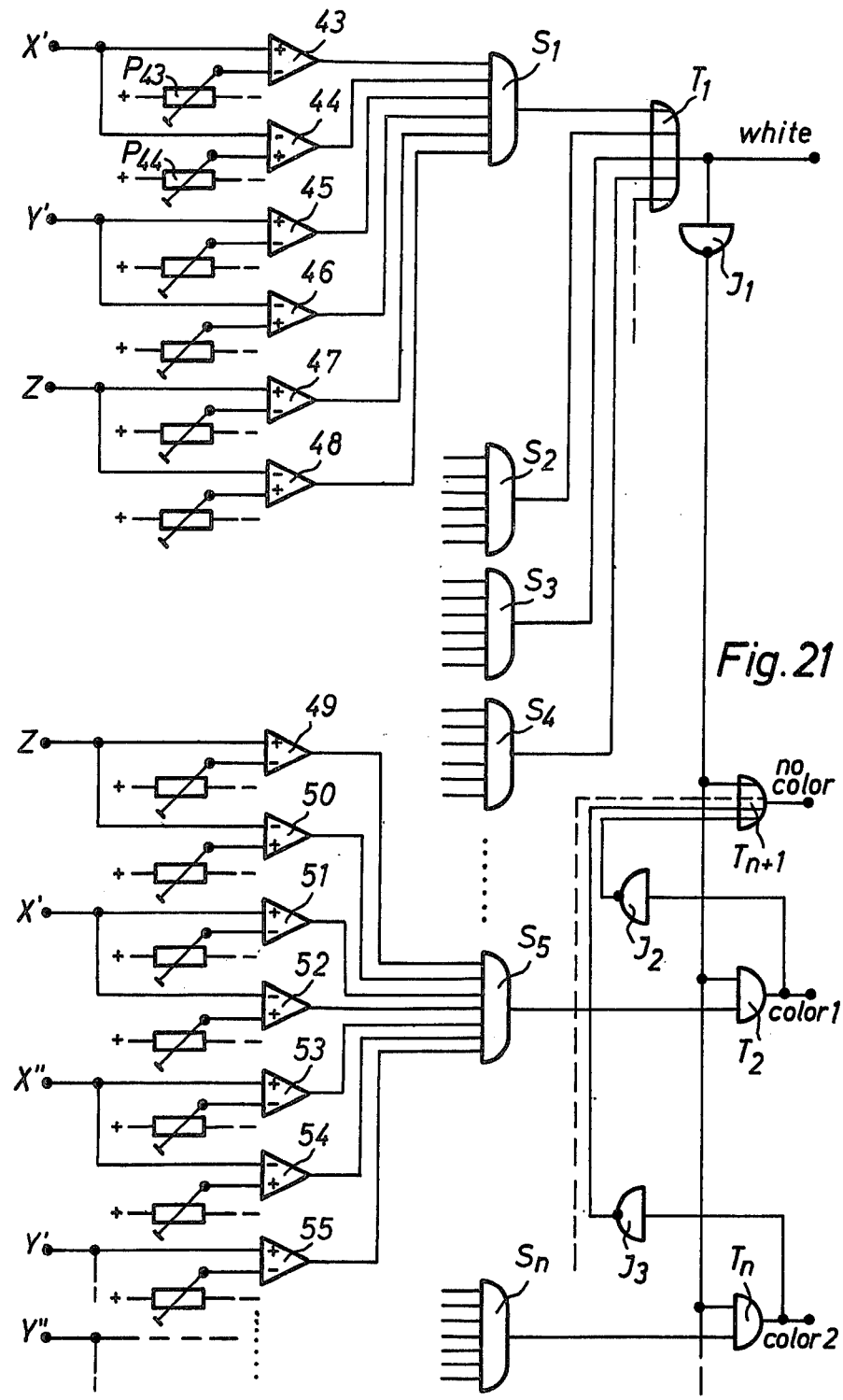
FIG. 21 shows a threshold-circuit for the delineation of the color-identification-regions.

FIG. 21 shows the evaluation of the signals $x'$, $y'$, $x''$, $y''$ and z which had been obtained through the different transformation-operations. For the different color-identification-regions, evaluation-circuits 43 to 55, comprising comparators are used in order to delineate the identification-regions. To the minus-input terminal of the amplifier 43, a reference-voltage is applied through a potentiometer $P_{43}$, and this reference-voltage can be positive or negative, depending on the setting of the potentiometer $P_{43}$. The transformed signal $x'$ arrives at the plus-input of the amplifier 43. If the signal $x'$ is of a larger order of magnitude than the reference-voltage at the minus-input, a signal is obtained, that is to say, the measured color-value lies above the prescribed threshold.

If recognition of the measured color-value $x'$ below a prescribed threshold, is required then the circuit-arrangement is set up in the reverse manner, namely in the manner shown in the case of the amplifier 44. The plus-, and minus-inputs have been exchanged here.

The threshold-value-stages for the other components are constructed analogously.

The output signals of the operational amplifiers 43 to 48 are transferred to an AND-gate $S_1$ which, at the moment when all input-signals are present at the output terminals, generates a signal which signifies "color identified." Thus, should the color "white" be identified, which occurs in several color identification-regions (e.g., in regions II, III, IV, and V of FIG. 14), then — for each color-region one set of comparators (which are adjusted to the corresponding thresholds or double-thresholds) respond via respectively assigned AND-gates $S_2$, $S_3$, $S_4$, etc., and a common OR-gate $T_1$, at the latter's output terminal of which the color "white" will always be identified when one set of comparators has responded for a color-identification-region.

The comparator-circuit with the operational amplifiers 49 to 55 and the AND-gate $S_5$ is provided for a color-identification-region in the case all components $x'$, $x''$, $y'$, $y''$ and z are to be evaluated, for example, a hexagonal prism.

If individual thresholds are equal to zero, or if individual components do not occur in a color-identification-region, the corresponding comparators for these thresholds can be omitted. In the example shown in FIG. 13, a comparator for $x'$ and one for $y''$ could be omitted.

If in FIG. 14, the color-identification-region I, which is representative for the color "black", is to be identified, then all comparators for $x''$ and $y''$, as well as comparator z, can be omitted.

It is also possible to delineate the color-identification-regions I to V, not only by means of quadratic xy-dimensions, but by a hexagonal delineation. Then, the $x''$-, and $y''$-components can likewise be used in conjunction with the others. It is also within the framework of the invention to solely use the $z$-, $x''$-, and $y''$-components.

A further advantageous possibility lies in still carrying out one or several additional rotations in order to obtain, for example, the $x'''$-, and $y'''$-components, for which likewise corresponding comparators would have to be provided. This would have the advantage that one would be able to delineate the identification-region in a still more refined manner.

In FIG. 21, only two sets of comparators are shown so as to keep the drawing sample. A characteristic feature also lies therein, in that in the case the color "white" has been identified, all other color-identification-circuits are blocked. Downstream of the OR-gate $T_1$, an inverter $I_1$ is connected which inverts the output signal L zero or, when "white" is not recognized, furnishes an L-signal. For each color, an AND-gate $T_2$ to $T_n$ is provided, which is moreover connected to the inverter $I_1$. If "white" is identified, all of the AND-gates $T_2$ to $T_n$ are blocked. If no "white" is identified, all of the gates $T_2$ to $T_n$ will will cease to be blocked when a comparator-group furnishes an output-signal via the AND-gates $S_5$ to $S_n$. Thus, the color is signaled at the output terminal of the corresponding AND-gate.

In FIG. 21, a logical circuit is provided with the aid of which it can be indicated when no color has been identified. For this purpose, the inverter $I_1$, as well as the inverters $I_2$, $I_3$, etc., are used which are connected to the output terminals of the individual color-identification-circuits and, in the case of the gates $T_1$ to $T_n$, provide no signal. These aforementioned inverters — due to their inverting action - provide a signal, namely via an OR-gate $T_{n+1}$. This case is obtained, for example, when the optical system detects a color which, to give an example, is characterized in FIG. 14, by the color-point "E." Such cases occur when the pattern is soiled or when colors have been painted one on top of the other. If the signal "no color" appears, the scanning is halted and the individual operating the equipment then adds the correct color. This has the advantage that patterns free from defects or errors can be produced.

The possibility also exists of not stopping the equipment and of storing the information for "color not recognized" as a code-word in order to manually correct this color-point during a later control measure.

Furthermore, in place of the manual input of the color, the color of the preceding point can be recorded, a step which can be repeated in cases of successive defects or errors. It is expedient to limit the number of repetitions, for example, by means of concurrently registering and adjustable counter, in order to subsequently either record "color not recognized" or add the color manually.

A further advantageous possibility exists in analyzing the field surrounding the point examined and indicate the most frequently occurring color. If an unambiguous decision cannot be made, one can then either record the information "color not recognized" or the input signal of the color can be set manually.

Through these types of evaluation, patterns completely free of defects or errors can be produced, be it directly during the scanning operation, or in the course of a subsequent correction procedure.

A further exemplified embodiment of the invention consists in analyzing not straight-lined prismatic color-identification-regions, but bent regions. This case becomes of interest when the transformation shown in FIGS. 7 and 8 is not implemented.

Figure 22:
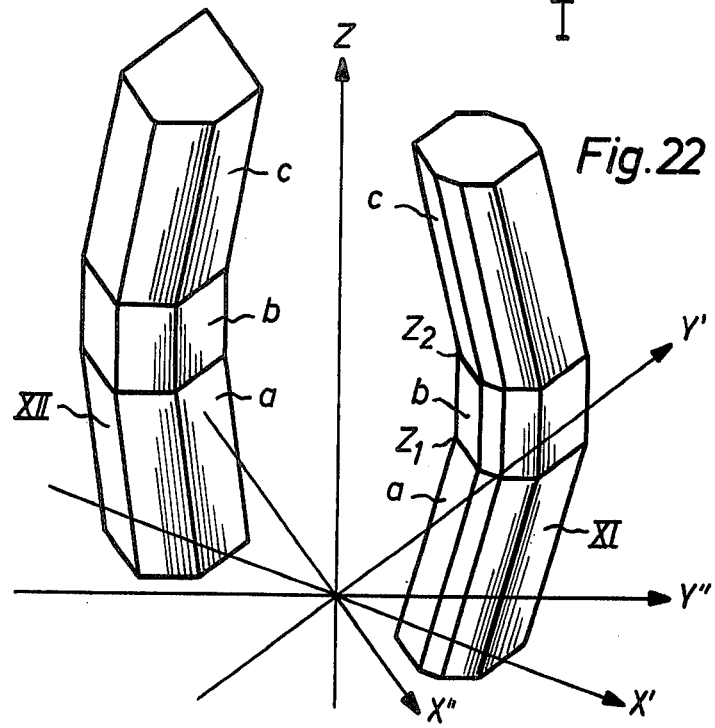
FIG. 22 shows an example of the delineation of a color-region through several partial regions.

FIG. 22 shows an exemplified embodiment for two identification-regions, which are adopted to the color arrangement shown in FIGS. 6a and 7. The identification regions XI and XII are each divided into three partial regions $a$, $b$, and $c$. For the identification purposes, a circuit arrangement according to FIG. 21 can be used; however, with the difference that — in place of the constant voltages applied to the potentiometers, which are connected to the operational amplifiers and determined the reference-voltage for the thresholds — a voltage which is dependent on the z-component is applied to the potentiometers. This can be achieved in a simple manner by using in each case, voltages or signal-values having the characteristic curve shown in FIG. 17. For the generation of the voltages, generators with the construction shown in FIG. 18 can be used.

Figure 23:
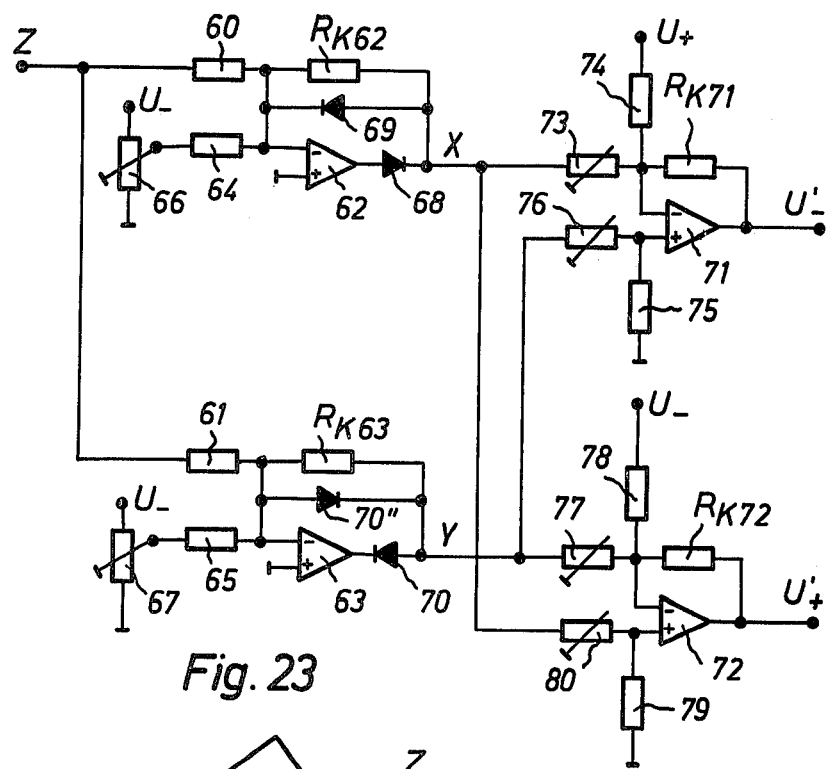
FIG. 23 shows an exemplified embodiment for the creation of a threshold-value-voltage which is dependent on the luminance-coordinate.
Figure 24:
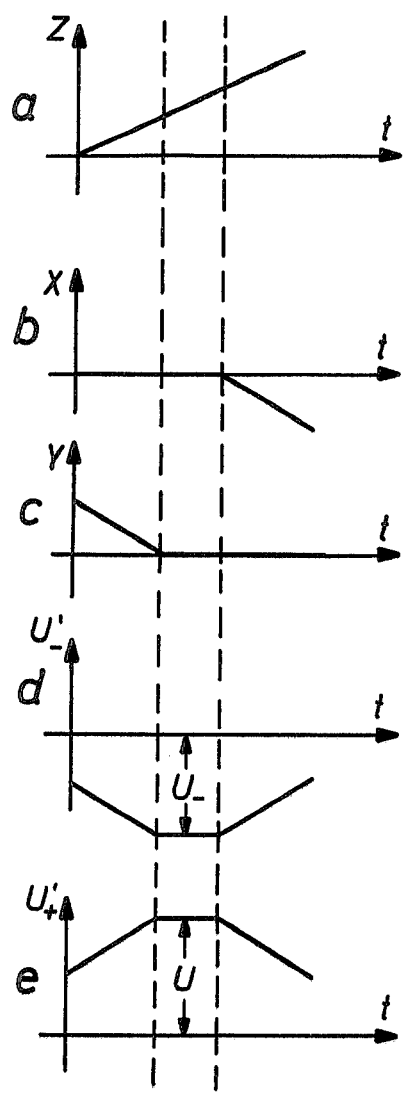
FIGS. 24a–e show schematized renderings, illustrating the make-up of the threshold-value-voltage of the circuit according to FIG. 23.

In place of the circuit-arrangement according to FIG. 18, one can also use one of the type shown in FIG. 23. In FIG. 23, the z-component is supplied, via resistors 60 and 61, to the minus-input terminals of the amplifiers 62 and 63. Moreover, the minus-input terminals are also connected, via resistors 64 and 65, to the voltage-dividers 66 and 67 which, in turn, are connected to the $-U$ voltage. In the case of the operational amplifier 62, a diode 68 is provided which — in the direction of current flow — is connected to the output terminal, and a diode 69 is provided which — likewise in the direction of current flow — bridges the feedback resistance $R_{k62}$. In the case of the amplifier 63, likewise two diodes 70 and 70' but of opposite polarity, are provided. The action of this circuit will be explained in more detail with the aid of FIG. 24.

FIG. 24a shows the increasing voltage of the z-component as a function of the time t, which should be applied to the resistances 60 and 61.

In FIG. 24b, the output voltage x at the diode 68 is maintained at zero for all $z_2$-values, whereby $z_2$ can be adjusted by means of the voltage-divider 66. The voltage, which lies above $z_2$, goes toward minus, because the operational amplifier 62 inverts.

Through the amplifier 63, all U-voltages — beginning from a value $z$, which can be adjusted by means of the voltage divider 67 — are maintained at zero. The corresponding voltage gradient is illustrated in FIG. 24c. In the case of an increasing z, a voltage, fed to the minus-input of the operational amplifier via the voltage divider by means of the negative voltage $-U$, — is reduced up to the value of zero. The fact that the voltage $y$ is positive at the output terminals of the amplifier is due to the inverting characteristic of the amplifier.

The output voltages $x$ and $y$ are added in FIG. 23 by means of two amplifiers 71 and 72 according to the following equations:

$$U_{-'} = -x + y - U_+$$
$$U_{+'} = -z + x - U_-$$

The corresponding voltage gradients are illustrated in FIGS. 24d and 24e. The $U_{-'}$ and $U_{+'}$ are the output voltages of the amplifiers 71 and 72. The voltage $x$ is supplied, via a resistance 73, to the minus-input terminal of the amplifier 71, which — likewise via a resistance 74 — is connected to a reference-voltage source $U_+$. The plus-input terminal of the amplifier 71 is connected to ground via a resistor 75, and is connected to the output voltage $y$ of the amplifier 63 via a resistor 76. The amplifier 72, which furnishes the voltage $U_+$ at the output terminal, is connected by means of its minus input terminal to the voltage $y$, namely via an adjustable resistor 77 and is connected to a negative voltage source U via a resistor 78. The plus-input terminal of element 72 is connected via a resistor 79 to ground, and via an adjustable resistor 80 to the voltage $x$.

Figure 25:
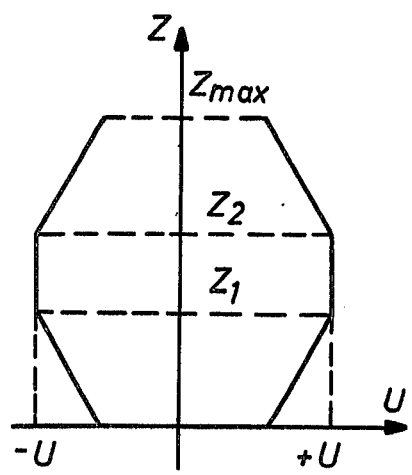
FIG. 25 shows the resulting course of the curves of the threshold-value-voltage.

FIG. 25 shows the voltages $U_-(z)$ and $U_+(z)$ as a function of $z$. The voltages are applied as reference-voltages in place of the "fixed-voltages" which, in the arrangement shown in FIG. 21, are applied to the comparators 43 to 55.

Figure 26:
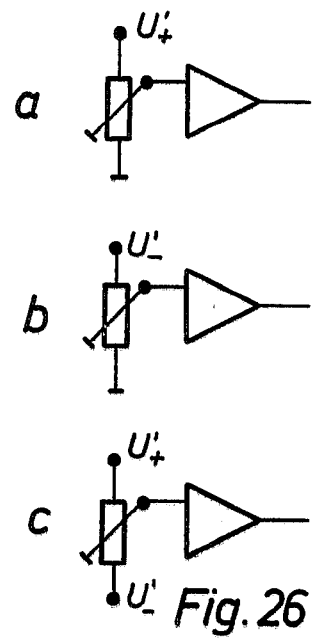
FIG. 26 shows examples of circuits for connecting the threshold-value-voltage to the comparators of FIG. 21.

In FIGS. 26a, 26b, 26c, variants are illustrated, in form of which these voltages are applied to the comparators of amplifiers 43 to 55.

With the aid of these voltages, the curved color-identification-regions illustrated in FIG. 22 can be delineated. Thus, to give an example, should only one bend occur in the identification-region, then $z_1$ and $z_2$ can be made to equal one another, which can be achieved by a proper adjustment of the potentiometers 66 and 67 shown in FIG. 23.

The different modular blocks or circuits of the invention can be combined with one another, depending on the required degree of accuracy, and depending on the number of colors to be checked or analyzed, or can be simplified when these requirements are not very high. A preferred use lies in the textile technology, namely for obtaining control data for pattern designs for textile machines, such as for looms, weaving-, or knitting-machines, whereby the obtained color-data are temporarily stored in coded form, for example on a magnetic tape, plates, or punched tapes, or punched cards, or in the form of Jacquard cards. For this purpose, such a color-identification device can work together with a computer. In another application, the color-identification-device can be integrated with a machine for the preparation of color extractions for the printing of textiles. In the textile printing process, each color is printed separately, which requires a separate color extraction, which can be accomplished by means of a color-identification circuit. The desired color to be extracted is selected via a logical circuit from a large number of identified colors.

Figure 27:
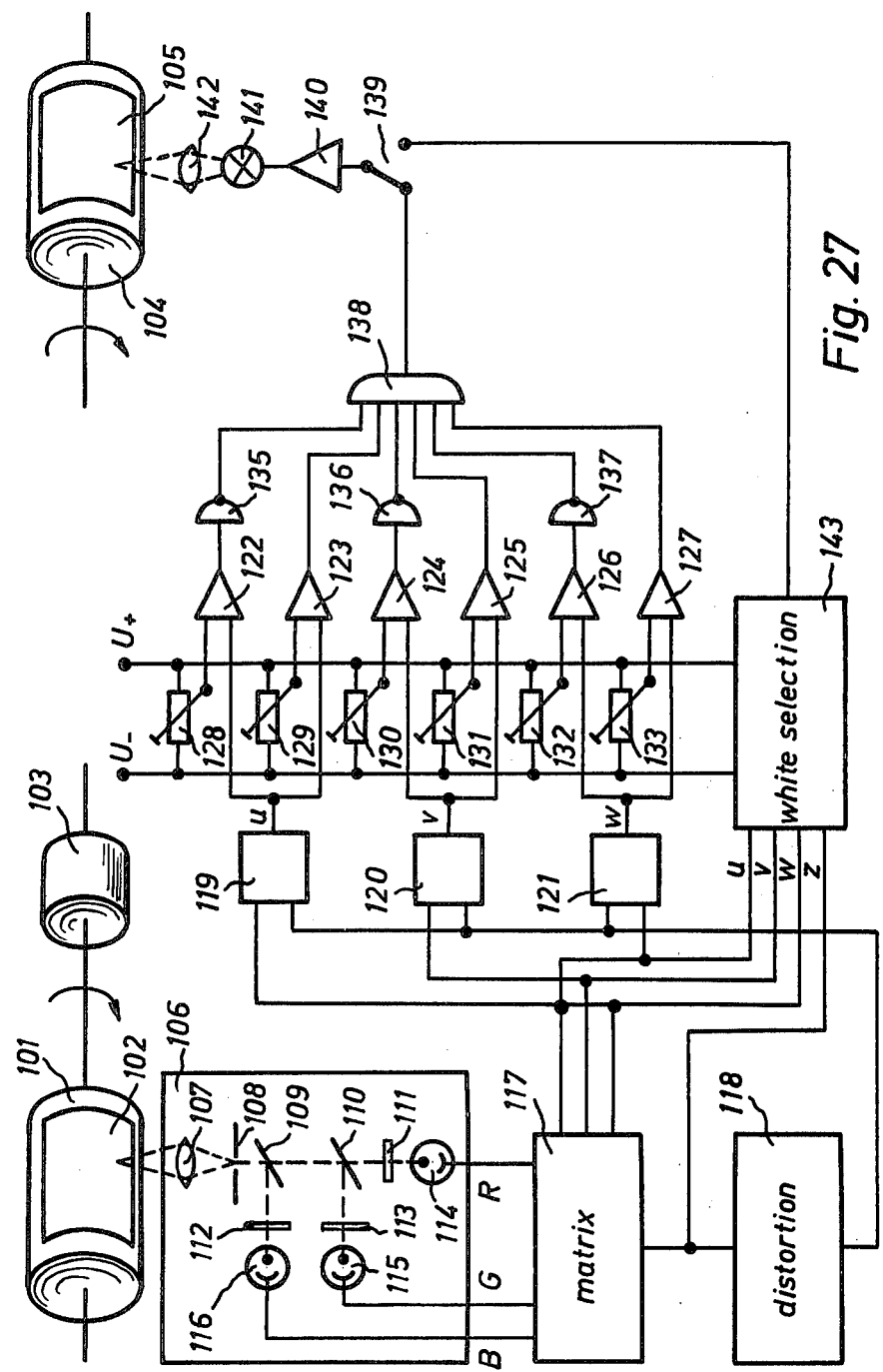
FIG. 27 shows an exemplified embodiment of the invention for the printing of textiles.

FIG. 27 shows an example of such a piece of equipment. A cylindrical roller 101 bears a color pattern 102 and is driven by a motor 103. Through the motor 103, moreover, a recording-roller 104 is set into rotation, which bears a recording tape 105 for the rerecording of the extracted color-signal. A scanning-head 106 is provided, which carries out an axial forward thrust and scans the pattern 102 along helicoidal lines. Via an optical system 107, a diaphragm 108, semi-permeable, or half-silvered mirrors 109 and 110, filters 111, 112, and 113, and photo-electrical transducers 114, 115, and 116, the primary color — measuring value — signals R, G, B, are obtained in the scanning head. These signals R, G, B, are then transformed in a matrix-circuit 117 which is illustrated in detail in FIG. 28, with the signals being transformed into a brightness-signal $z = + R + G + B$ and into three color-coordinate-signals.

$U = + R - G;$
$V = + B - G;$ and
$W = + R - B.$

Figure 30:
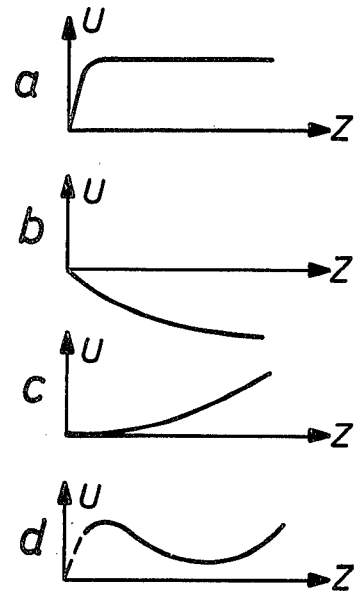
FIG. 30 shows the courses of the curves for the distortion-correction circuit of FIG. 29.

The color-coordinate-signals U, V, and W, lie in a plane perpendicular to the brightness-signal $z$. The brightness-signal is distorted or transformed in stage 118 in accordance with the characteristics shown in FIG. 30. The U, V, W,-color-components are subsequently multiplied with this distorted brightness-signal $z$ in the multiplying-units 119, 120, and 121, a step which corresponds to the transformation which is illustrated in FIG. 8; in other words, at a low and high degree of the brightness $h$, the $x$, $y$, $z$-values increase to a greater extent than in the middle range. As multiplying-units commercially available circuits can be used, such as for example Type AD 532, manufactured by the Analog Devices Company. The signals U', V', and W', which appear at the output terminals of the multiplying-units 119, 120, and 121, are then transferred in accordance with FIG. 21, to the amplifiers 122 to 127, which serve as controlling elements for the threshold-values and obtain their threshold-value-voltage, via potentiometers 128 to 133, from a constant current source U. Depending on whether value should be indicated exceeding or falling below a threshold, inverters 135, 136, and 137 are postcoupled to the amplifiers 122, 124, and 126, the output signals of the inverters being transferred, together with the output signals of the amplifiers 123, 125, and 127, to an AND-gate 138, which indicates at its output when the color occurs which has been delineated by the adjustable thresholds 128 to 133.

Through a change-over switch 139 and an amplifier 140, this signal from the output of the AND-gate 138 is fed to a recording lamp 141 with the aid of which the extracted color is recorded, through the intervention of an optical system 142, on the recording-film 105. A white-selection-circuit 143 is also connected to the change-over-switch 139, with the color-identification-regions A, B, and C shown in FIG. 31 being analyzed by this white-selection circuit 143. The exact circuit-arrangement of the circuit 143 is given in FIG. 32.

Figure 28:
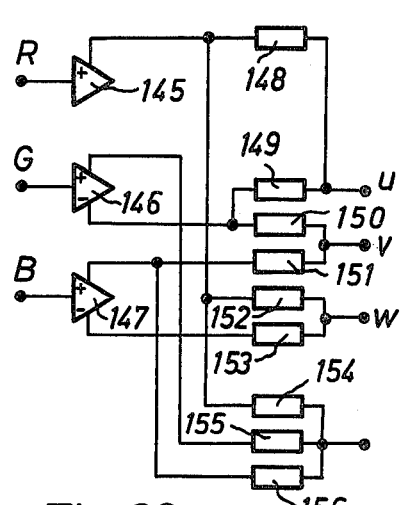
FIG. 28 shows a matrix-circuit according to FIG. 27.

In FIG. 28, the matrix-circuit 117 of FIG. 27 is shown in more detail. The primary color — measuring value — signals R, G, B are obtained from the outputs of the bipolar amplifiers 145, 146, and 147, at the resistances 148 to 156, which are connected in such a manner so that the following transformation equations are implemented:

$U = + R - G$
$V = + B - G$
$W = + R - B$
$Z = + R + G + B.$

Figure 29:
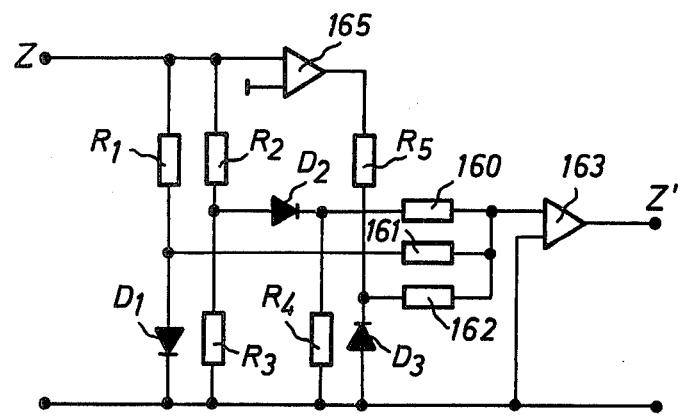
FIG. 29 shows a distortion-circuit according to FIG. 27.

FIG. 29 shows an example of a distortion-circuit 119 of the brightness-signal $z$ of FIG. 27. The signal $z$ is fed to three different distortion-stages, the output signals of which, passing through the decoupling-resistance 160, 161, and 162, are added together at the input terminals of the amplifier 163. In the first stage $R_1$, $D_1$, the function curve shown in FIG. 30a is generated. By assigning a low value to the resistor $R_1$, the diode $D_1$ passes into saturation at an early point. In the second stage, in which the signal $z$ is divided by the resistors $R_2$, $R_3$, the diode D becomes conductive only in the case of relatively higher values of $z$, which leads to a voltage output at resistance $R_4$ as shown in FIG. 30c. The third stage decreases the sign of the signal $z$ with the aid of the amplifier 165. The diode $D_3$ limits the negative voltage, the course of which is shown in FIG. 30b. The resistor $R_5$ is selected in such a manner that the signal is limited in this third stage at a later point than in the first stage. FIG. 30d indicates the summation-voltage of the three stages, with which the color-components U, V, W, are multiplied in the multiplying-units 119, 120, and 121, of FIG. 27.

Figure 31:
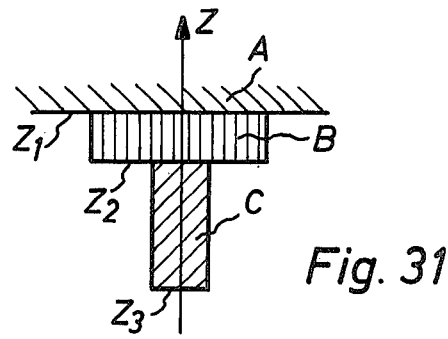
FIG. 31 gives an example of the color-identification-regions for "white," according to FIG. 27.
Figure 32:
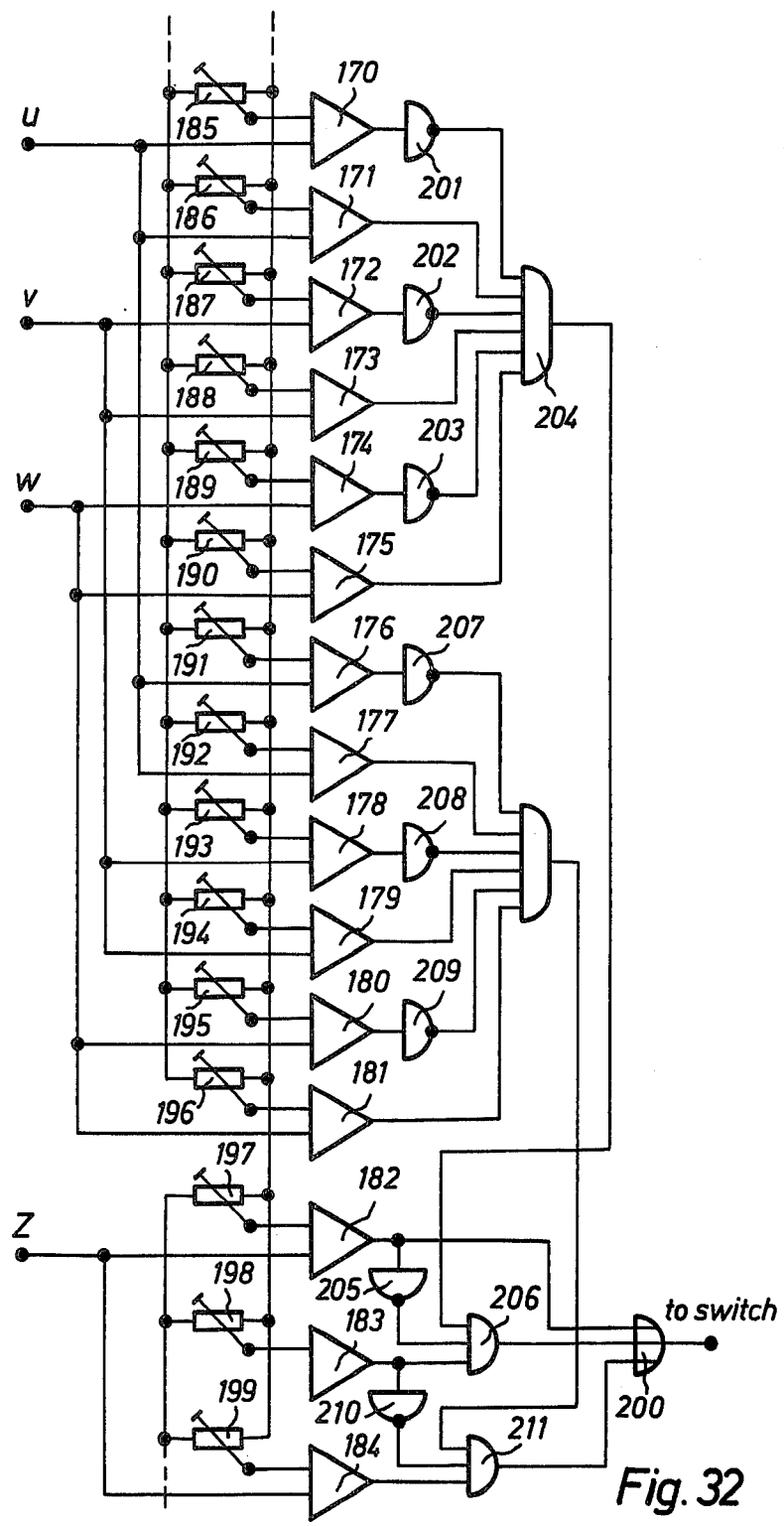
FIG. 32 shows an exemplified embodiment for selecting a white region according to FIG. 27.

In FIG. 31, three identification regions are provided for the color "white," which represent a simplification with respect to FIG. 10. From the transformation-matrix 117 (FIG. 28), the color-components, U, V, W, and the brightness-signal z are supplied to the white-selection-circuit 143 shown in FIG. 27, the specific circuit-arrangement of which is given in FIG. 32. As shown in FIG. 32, the color-component U, V, W, and the brightness-signal z are transferred to the amplifiers 170 to 184, with the aid of which, the color-identification-regions given in FIG. 31 are delineated. The threshold-value-voltages are set by the potentiometers 185 to 199.

Thus, should for example the color-region A of FIG. 31 be identified, then the z-component must be of a larger order of magnitude than $z_1$. This condition is met by the threshold-value stage including amplifier 182 and potentiometer 197. If z is of a larger order of magnitude than the threshold-value established at the potentiometer 197, the signal "color identified" is obtained at the switch 139 of FIG. 27, through the OR-gate 200.

If the color-region B of FIG. 31 is to be identified, then the U, V, W,-values must lie within the following limits, namely $$-U_1 < U < +U_1$$

$$-V_1 < V < +V_1$$

$$-W_1 < W < +W_1.$$

For U, comparators 170 and 171 are provided and the potentiometer 185 is adjusted to the value $+U_1$ and the potentiometer 186 to the value $-U_1$. If a value below the value $+U_1$, the comparator 170 furnishes the signal "zero," which is inverted to "1" by the inverter 201. If a comparator $-U_1$ is exceeded, then the signal "1" appears. Comparators 172, 173, for V and comparators 174, 175 for W are constructed in a similar manner, whereby inverters 202 and 203 are provided if the value falls below the positive values. If the thresholds $-U_1$, $-V_1$, $-W_1$ are exceeded and if a value below the thresholds $+U_1$, $+V_1$, $+W_1$, then there appears at the output terminals of the adding-unit 204 a signal which fulfills the signal-threshold-value-condition for U, V, W, of the color-identification-region B of FIG. 31. The Z component is analyzed by means of the comparators of amplifiers 182 and 183. The threshold of the comparator for $Z_1$ is not reached or falls short, which is the reason why a signal "1" appears at the inverter 205. The threshold of the comparator 183 for $Z_2$ is exceeded, which likewise to results in a signal "1." The output signals of the comparator 183, of the inverter 205 and of the AND-gate 204, are joined at the AND-gate 206 which, in case the threshold-value-conditions for the region B are met, furnishes the signal "1," that is, the signal "color identified," which in turn appear at the switch of FIG. 27, via the OR-gate 200.

The color-identification-region A of FIG. 31 is identified with the aid of the comparators of amplifiers 176 to 181 for U, V, W, and with the aid of comparators 183 and 184 for Z. For the indication that the values of the thresholds for $+U_2$, $V_2$, $W_2$ fall short, the inverters 107 to 209 are used, in the case of the threshold for $Z_2$, the inverter 210 is used. The individual thresholds are then joined via the AND-gate 211, which transmits its signal "color identified" via the OR-gate 200.

Figures 33, 34:
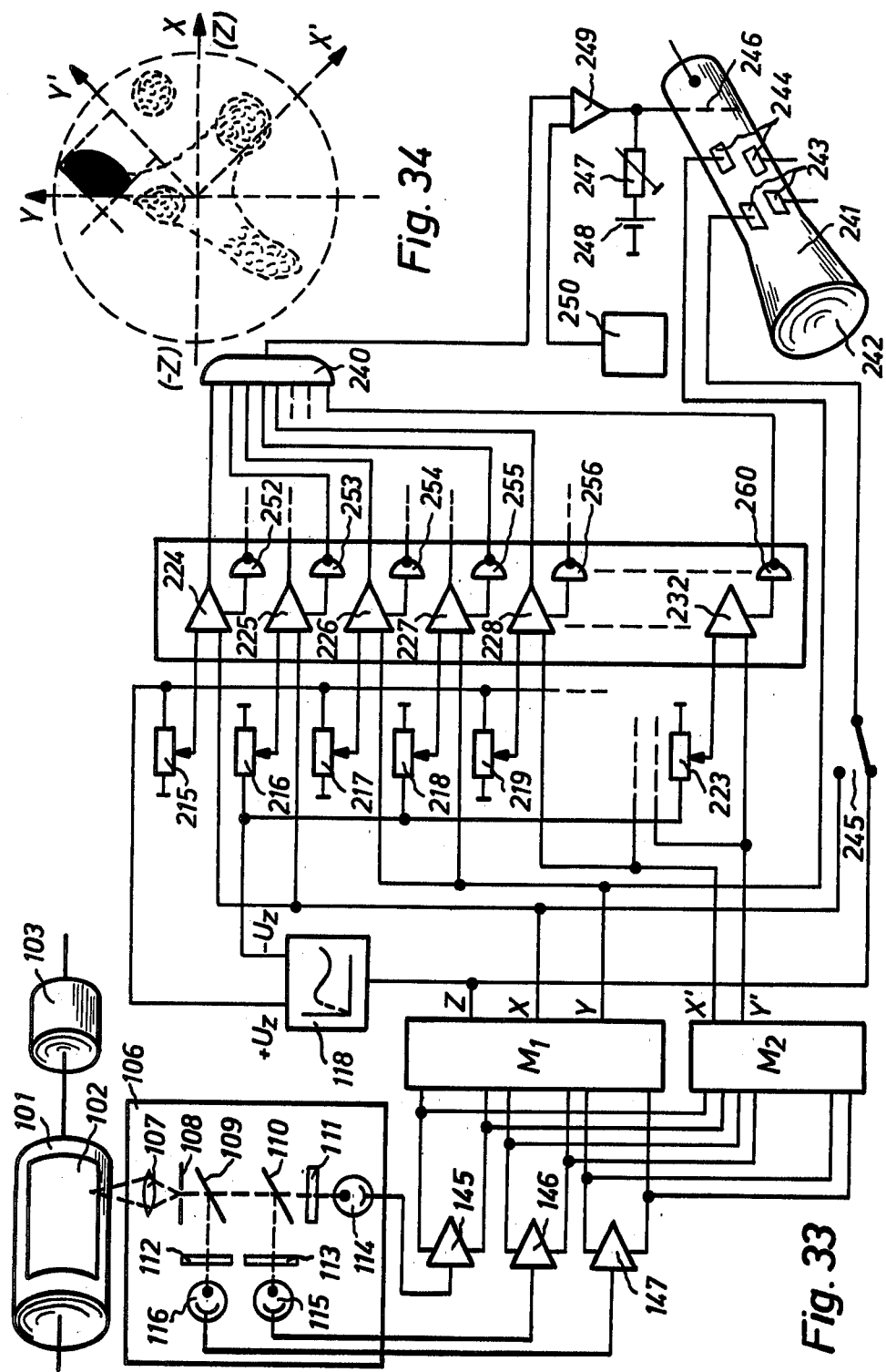
FIG. 33 shows an exemplified embodiment of the invention.
FIG. 34 shows a detail of the identified color-region.

FIG. 33 shows an example for visibly identifying a color-region directly by means of an electron-beam-tube. Up to the amplifiers 145, 146, 147, the scanning of the pattern takes place in the same manner as in FIGS. 27 and 28. To the output signals of these amplifiers, two transformation-matrixes $M_1$ and $M_2$, are connected, of which the first one, $M_1$ and $M_2$, are connected, of which the first one, $M_1$, furnishes the signals x, y, and z of FIG. 4, and of which the second one, $M_2$, furnishes the signals x'y' of FIG. 12. The signals x'y' are rotated by 45° with respect to the signals x, y. Corresponding circuit-arrangements have been already indicated. The brightness-, or luminance-component z is subjected in the stage 118 to the same conversion as in the stage 118 of FIG. 27. The corresponding circuit arrangement is shown in FIG. 23. The voltages $+U_z$ and $-U_z$, which follow the course illustrated in FIG. 25, are transferred to the voltage dividers 215 to 223, following which comparators 224 to 232 are inserted into the circuit, which in each case, receive the $\pm x$, $\pm x'$, $\pm y$, $\pm y'$-signals of the matrices $M_1$ and $M_2$. Through the adjustment of the threshold-values of the voltage dividers 215 to 223, color-identification-regions with thresholds $x_1$, $x_2$, $y_1$, $y_2$, $x_2'$, $y_1'$, $y_2'$, can be established. The inverters 231 to 239 serve to ascertain whether a value has fallen below a threshold. The output signals of the comparators 224 to 232 and the inverters 231 to 239 are supplied to an AND-gate 240, which in turn provides an output signal when all components lie within the set threshold values.

An electron-beam tube 241 is provided, the tube-screen 242 of which is once more illustrated separately in FIG. 34. The electron-beam-tube includes the deflector-plate pairs 243 and 244, one pair of which is connected to the y-component of the matrix $M_1$, whereas the other pair can be selectively connected, via a switch 245, to the z-, or x-component. The control-grid 246 of the electron-beam-tube is connected via a resistance 247 to a voltage-source 248, which furnishes a background. At the same time, the signal from the AND-gate 240 is transferred via a modulator 249 to the control grid 246, whereby the signal is modulated by a low frequency of up to 16 Hz which is supplied by a generator 250. This results therein, that the identified color-region flashes against the background and thus becomes identifiable. In FIG. 34, the coordinates x, y, as well as x'y', are plotted and the identified color-region outlined with relatively stronger lines. Through switching of the switch 245, the z-component can also be made visible in place of the y-component.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. Process for identifying a predetermined color from a plurality of colors, including monochrome colors, on the surface of an object which is scanned by photo-electrical means, a plurality of measured signals being defined by a first set of coordinates and representing color components red, green, and blue of a predetermined brightness, said plurality of color components defining a preselected color-identification-region, a plurality of threshold-value circuit means simulating the boundaries of the color-identification region for each of the coordinates, a plurality of coincidence circuits receiving output signals of said threshold-value means, respectively, for indicating the presence of said predetermined color, comprising the steps of:

generating the measured signals;

processing said measured signals to define a chrominance-luminance color-region (x, y, z), having chrominance coordinates (xy) and luminance coordinates (z), in which the color-components of the measured signals are assigned to the chrominance-coordinates (xy), and the brightness of the measured sample is assigned to the luminance-coordinates (z);

said measured signals defining a gray straight-line;

transforming said luminance coordinates to coincide with said grey straight-line;

defining a predetermined luminance region in said color-identification region; and identifying the predetermined color upon the chrominance and luminance coordinates defined by said measured signals being within the boundaries of said color-identification region, the output signals of said threshold-value circuit means being constant for the luminance-coordinates and varying for each chrominance-coordinate as a function of the luminance-coordinates the output signals of said threshold-value circuit means decreasing below and above the predetermined luminance-region.

2. The process according to claim 1, further comprising the steps of transforming the chrominance-components of said measured signals (x,y) into a second chrominance-luminance color-region (x'y'z') having a second set of coordinates, stretching said signals as a function of the luminance above and below the predetermined luminance-region, and defining said color-identification region through corresponding constant thresholds defined by said second set of coordinates.

3. The process according to claim 1, further comprising the step of transforming the chrominance components of said measured signals into the chrominance-luminance color-region (x, y, z) according to the following equation:

$x = 0.789 R - 0.211 G - 0.578 B$
$y = -0.211 R + 0.789 G - 0.578 B$
$z = 0.578 R + 0.578 G + 0.578 B$ wherein x, y represent the chrominance coordinates of the chrominance-luminance color-region, z represents the luminance-coordinate of the chrominance-luminance color-region, and R, G, B, represent the magnitude of the color signals red, green, and blue, respectively.

4. The process according to claim 1, further comprising the step of transforming the chrominance components of said measured signals into the chrominance-luminance color-region in accordance with the following equations:

$u = R - G$
$v = B - G$
$w = R - B$
$z = R + G + B,$ wherein R, G, B, represent the magnitude of the color signals red, green, and blue, respectively, u, v, w, represent the chrominance coordinates of the chrominance-luminance color-region, and z represents the luminance coordinates of the chrominance-luminance color-region.

5. The process according to claim 21, wherein said chrominance-luminance color-region has a point of origin, wherein each measured signal is defined by a vector extending from said origin to the chrominance-luminance coordinates corresponding to the measured signal, and wherein said luminance coordinates define a luminance vector, and further comprising the steps of rotating the vector corresponding to the chrominance coordinates, prior to the processed signal being received by said threshold-value circuit means about the luminance coordinate by a predetermined angle, and superimposing the rotated and non-rotated vectors, whereby the plurality of threshold-value circuit means simulate the boundaries of both the rotated and non-rotated vectors of the signals defining the pre-selected color-identification region.

6. The process according to claim 5, further comprising the steps of rotating the vectors in accordance with the following equations:

$y' = a(x + y)$ $x' = b(x - y),$ wherein a and b are constant for a predetermined angle of rotation, and x' and y' define the coordinates corresponding to the rotated vectors in terms of the x and y coordinates and the constants.

7. The process according to claim 5, further comprising the steps of rotating the vectors by a second predetermined angle about the luminance vector, and superimposing both the rotated and non-rotated vectors of the signals defining the preselected color-identification region, whereby said preselected color-identification region is defined in a relatively more precise manner.

8. The process according to claim 5, further comprising the step of subdividing the color-identification region in the direction of the luminance coordinate into several color-identification sub-regions adjacent one another.

9. The process according to claim 5, further comprising the steps of defining a second luminance region in said color-identification region, and wherein said color-identification region is bounded by said luminance regions, said first luminance region being an upper region, and said second luminance region being a lower region, and wherein, when identifying a monochrome color, the output signals of said threshold value circuit means are of equal value.

10. The process according to claim 5, further comprising the steps of defining a second luminance region in said color-identification region, and wherein said second color-identification region is bounded by said luminance regions, said first luminance region being an upper region, and said second luminance region being a lower region, and wherein the output signals of said threshold value circuit means vary between the upper and lower regions when identifying a monochrome color as a function of the luminance coordinate of said monochrome color.

11. The process according to claim 5, wherein means are provided for normally setting the output signals of said threshold-value circuit-means, and in the event the predetermined color occurring most frequently in said zone cannot be generated unambiguously, manually setting the threshold-value circuit-means to the color occurring most frequently in said zone.

12. The process according to claim 1, wherein means are provided for manually setting the output signals of said threshold-value circuit means, and further comprising the steps of generating a signal for inhibiting identification of a further predetermined color in the event the predetermined color is not identified, and manually setting and correcting the output signal of said threshold-value circuit means to identify the predetermined color.

13. The process according to claim 12, further comprising the steps of generating a color preceding the step of manually setting and correcting the output signals of said threshold-value circuit-means, and limiting the preceding color to a predetermined number of image-points.

14. The process according to claim 1, wherein a signal has been generated identifying a color preceding said predetermined color, and further comprising the steps of generating a control signal, in the event the predetermined color is not identified, said control signal controlling the generation of the signal identifying the preceding color.

15. The process according to claim 1, wherein a zone having predetermined color components surrounds said preselected color identification regions, a certain number of predetermined colors occurring most frequently in said zone, and further comprising the steps of generating a control signal in the event the predetermined color is not identified, said control signal controlling evaluation of the color components of said zone, and generating the predetermined color occurring most frequently in said zone.

16. Process for identifying a predetermined color from a plurality of colors, including monochrome color, on the surface of an object which is scanned by photoelectrical means to produce measured signals defined by a first set of coordinates and having color components red, green, and blue of a predetermined brightness, said plurality of color components defining a preselected color-identification region for each of the coordinates, a plurality of coincidence circuits receiving output signals of said threshold-value circuit means, respectively, for indicating the presence of said predetermined color, the steps comprising:

processing said measured signals to define a chrominance-luminance color-region $(x, y, z)$, having chrominance coordinates $(xy)$ and a luminance coordinate $(z)$, in which the color-components of the measured signals are assigned to the chrominance-coordinates $(x)$, and the brightness of the measured sample is assigned to the luminance-coordinate $(z)$;

said measured signals defining a gray straight-line;

transforming said luminance-coordinate to coincide with said gray straight-line;

defining a predetermined luminance region in said color-identification region; and identifying the predetermined color upon the chrominance and luminance coordinates defined by said measured signals being within the boundaries of said color-identification region.

17. A circuit-arrangement for the identification of a predetermined color from a plurality of colors in an object, comprising, in combination:

photo-electrical transducer means for obtaining of trichromatic color - measuring signals;

threshold-value circuit-means and coincidence-circuits connected to said threshold-value circuit-means for delineating a color-identification-region within said plurality of colors, said signals being defined by a set of coordinates, said threshold value-circuit-means including a plurality of threshold-value circuits corresponding to predetermined color-identification regions, each coincidence circuit being connected to a corresponding threshold-value circuit, transforming means connected to the output of said transducer means for transforming the coordinates and having the following transformation properties:

$$x = 0.789 R - 0.211 G - 0.578 B$$

$$y = -0.211 R + 0.789 G - 0.578 B$$

$$z = 0.578 R + 0.578 G + 0.578 B,$$

wherein

R, G, B, represent the coordinates corresponding to said trichromatic color-measuring signals, $x, y,$ represent chrominance signals, and $z$ represents a luminance-signal, said transforming means including a matrix providing the chrominance signals $(x)$, and the luminance signal $(z)$, subtracting-units connected to the chrominance signal output of said matrix, and a function generator connected to the luminance-signal output of said matrix, for generating a signal which is dependent on the luminance $(z)$, said subtracting units subtracting the luminance-dependent signal $(z)$ from the chrominance signals $(x, y)$, said luminance-dependent signal having a constant value in the $((z/2) - c_1) < z < (z/2 + c_2)$ region and decreasing linearly in the region $z < ((z/2))$, and $z > ((z/2) + c_2)$, wherein $c_1$ and $c_2$ are predetermined constants.

18. The circuit according to claim 17, further comprising an additional transforming means including a second matrix connected to the chrominance signal-output $(xy)$, or $x(z)$, of the first matrix, said additional transforming means having the following transformation properties:

$$y' = a(x + y)$$

$$x' = b(x - y),$$

wherein $a$ and $b$ are constants for a predetermined angle of rotation, wherein $x', y'$ are rotated chrominance signals, and further comprising a second set of threshold value circuits, and wherein the chrominance signal $x, y$, or $x(z), y(z)$ of the first matrix and the chrominance signal outputs $(x',y')$ of said second matrix are connected to the second set of threshold-value circuits of the individual color-identification regions, respectively.

19. The circuit arrangement according to claim 18, wherein a predetermined set of said AND-gates generate said color-identification signal, and further comprising a second set of threshold-value circuits, a common AND-gate connected to said set of threshold-value-circuits, and a set of inverters connected to said predetermined set of AND-gates, respectively, whereby said common AND-gate generator furnishes a "No color identified" signal.

20. The circuit arrangement according to claim 17, wherein each threshold-value circuit includes an operational amplifier having a plus-input and a minus-input, and wherein the signal to be evaluated is fed to the plus-input or minus-input, and a reference-voltage-source for determining the threshold-value connected to the minus-input or the plus-input for indicating that the threshold has exceeded or fallen below a predetermined value, and an AND-gate, connected to the outputs of the operational amplifiers for generating a color-identification signal when all of the threshold-value-circuits connected thereto generate a signal.

21. The circuit arrangement according to claim 17, wherein said constant value is equal to "1."

* * * * *